US012581352B2

(12) United States Patent
Xia et al.

(10) Patent No.: US 12,581,352 B2
(45) Date of Patent: Mar. 17, 2026

(54) DATA TRANSMISSION METHOD, USER EQUIPMENT, AND BASE STATION

(71) Applicant: Huawei Technologies Co., Ltd., Shenzhen (CN)

(72) Inventors: Shenjie Xia, Shanghai (CN); Cheng Chen, Shanghai (CN); Ping Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 576 days.

(21) Appl. No.: 18/154,553

(22) Filed: Jan. 13, 2023

(65) Prior Publication Data

US 2023/0171636 A1 Jun. 1, 2023

Related U.S. Application Data

(63) Continuation of application No. PCT/CN2021/092195, filed on May 7, 2021.

(30) Foreign Application Priority Data

Jul. 17, 2020 (CN) .......................... 202010693444.3

(51) Int. Cl.
| | |
|---|---|
| *H04W 28/02* | (2009.01) |
| *H04W 72/12* | (2023.01) |
| *H04W 72/543* | (2023.01) |

(52) U.S. Cl.
CPC ................. *H04W 28/0263* (2013.01); *H04W 28/0268* (2013.01); *H04W 28/0278* (2013.01); *H04W 72/12* (2013.01); *H04W 72/543* (2023.01)

(58) Field of Classification Search
CPC ......... H04W 28/0263; H04W 28/0268; H04W 28/0278; H04W 72/12
See application file for complete search history.

(56) References Cited

U.S. PATENT DOCUMENTS

| | | | |
|---|---|---|---|
| 2018/0234524 A1* | 8/2018 | Cheng .................. | H04W 28/02 |
| 2019/0053260 A1 | 2/2019 | Shaheen | |

(Continued)

FOREIGN PATENT DOCUMENTS

| | | |
|---|---|---|
| CN | 109392018 A | 2/2019 |
| CN | 109716817 A | 5/2019 |

(Continued)

OTHER PUBLICATIONS

3GPP TS 23.501 V15.6.0 (Jun. 2019), 3rd Generation Partnership Project; Technical Specification Group Services and System Aspects; System Architecture for the 5G System; Stage 2 (Release 15), total 243 pages.

(Continued)

*Primary Examiner* — Ajay Cattungal
(74) *Attorney, Agent, or Firm* — Conley Rose, P.C.

(57) ABSTRACT

A data transmission method includes obtaining a first data packet generated by a first application running on a user equipment; using the first data packet as a to-be-transmitted data packet on a first logical channel (LC) when the first data packet carries a first identifier indicating that the first data packet needs to be sent on an air interface according to a first transmission quality requirement; sending, to a base station, a first buffer status report (BSR) that includes indication information of the first transmission quality requirement for allocating a first air interface resource to the first LC according to the first transmission quality requirement; and sending, to the base station, the to-be-transmitted data packet on the first LC using the first air interface resource.

20 Claims, 16 Drawing Sheets

(56) References Cited

U.S. PATENT DOCUMENTS

| | | | |
|---|---|---|---|
| 2019/0254118 A1 | 8/2019 | Dao et al. | |
| 2020/0084669 A1 | 3/2020 | Belleschi | |
| 2020/0169926 A1* | 5/2020 | Hwang | H04W 80/08 |
| 2022/0061055 A1* | 2/2022 | Freda | H04W 72/1263 |
| 2022/0104124 A1* | 3/2022 | Shah | H04W 72/1263 |
| 2022/0393839 A1* | 12/2022 | Jung | H04W 76/10 |
| 2023/0120096 A1* | 4/2023 | Kim | H04W 76/19 |
| | | | 370/329 |

FOREIGN PATENT DOCUMENTS

| | | | |
|---|---|---|---|
| WO | 2014139083 A1 | 9/2014 | |
| WO | 2015019043 A1 | 2/2015 | |
| WO | 2018075151 A1 | 4/2018 | |
| WO | 2018130968 A1 | 7/2018 | |
| WO | 2019158699 A1 | 8/2019 | |
| WO | 2020063465 A1 | 4/2020 | |

OTHER PUBLICATIONS

3GPP TS 23.502 V15.7.0 (Sep. 2019), 3rd Generation Partnership Project; Technical Specification Group Services and System Aspects; Procedures for the 5G System (5GS); Stage 2 (Release 15), total 357 pages.

3GPP TS 23.503 V16.2.0 (Sep. 2019), 3rd Generation Partnership Project; Technical Specification Group Services and System Aspects; Policy and Charging Control Framework for the 5G System (5GS); Stage 2(Release 16), total 104 pages.

3GPP TS 38.321 V15.6.0 (Jun. 2019), 3rd Generation Partnership Project; Technical Specification Group Radio Access Network; NR; Medium Access Control (MAC) protocol specification (Release 15), total 76 pages.

* cited by examiner

Base station 200

User equipment 100

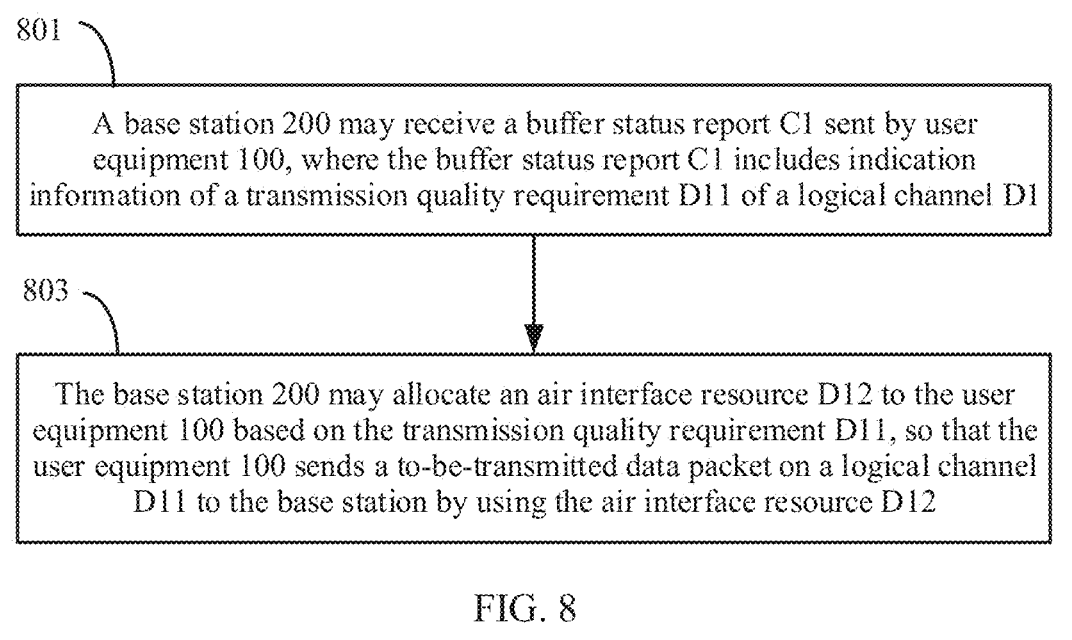

801

A base station 200 may receive a buffer status report C1 sent by user equipment 100, where the buffer status report C1 includes indication information of a transmission quality requirement D11 of a logical channel D1

803

The base station 200 may allocate an air interface resource D12 to the user equipment 100 based on the transmission quality requirement D11, so that the user equipment 100 sends a to-be-transmitted data packet on a logical channel D11 to the base station by using the air interface resource D12

FIG. 8

RB allocated to UE 2 — RB allocated to UE 3 — RB allocated to UE 1

RB allocated to UE 2 — RB allocated to UE 3 — RB allocated to UE 1

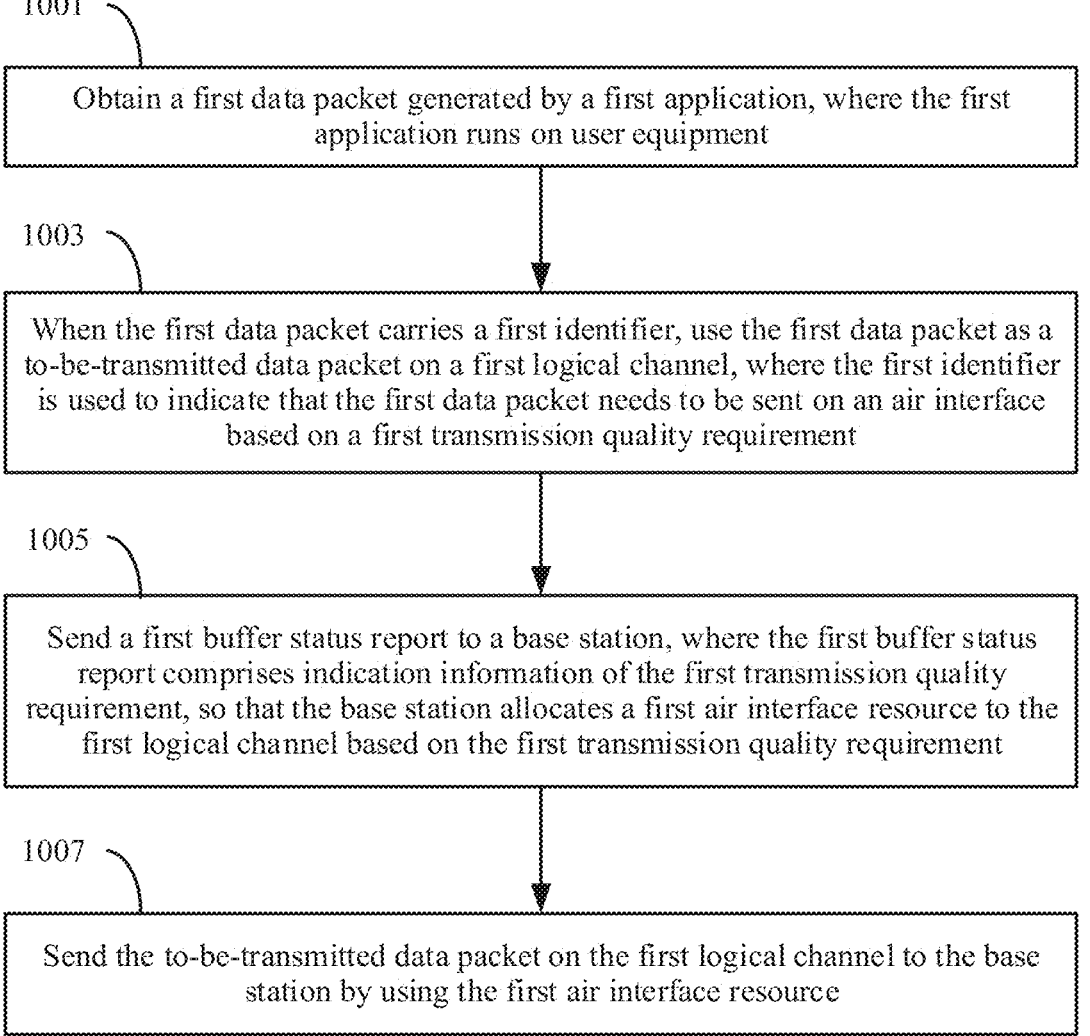

1001

Obtain a first data packet generated by a first application, where the first application runs on user equipment

1003

When the first data packet carries a first identifier, use the first data packet as a to-be-transmitted data packet on a first logical channel, where the first identifier is used to indicate that the first data packet needs to be sent on an air interface based on a first transmission quality requirement

1005

Send a first buffer status report to a base station, where the first buffer status report comprises indication information of the first transmission quality requirement, so that the base station allocates a first air interface resource to the first logical channel based on the first transmission quality requirement

1007

Send the to-be-transmitted data packet on the first logical channel to the base station by using the first air interface resource

DATA TRANSMISSION METHOD, USER EQUIPMENT, AND BASE STATION

CROSS-REFERENCE TO RELATED APPLICATIONS

This application is a continuation of International Patent Application No. PCT/CN2021/092195, filed on May 7, 2021, which claims priority to Chinese Patent Application No. 202010693444.3, filed on Jul. 17, 2020. The disclosures of the aforementioned applications are hereby incorporated by reference in their entireties.

TECHNICAL FIELD

This disclosure relates to the field of communication technologies, and specifically, to a data transmission method, user equipment (UE), and a base station.

BACKGROUND

Currently, in a cellular wireless system, a fifth generation (5G) mobile communication technology has gradually entered a use phase. In the 5G mobile communication technology, a service priority and a quality of service (QoS) policy are scheduled using a data flow as a granularity. In this scheduling solution, a data flow of a high priority is always in a high priority state. However, in actual application, a specific data flow of a high priority does not always have important information to transfer. For example, for a multiplayer online battle arena (MOBA) game, an action flow (a data flow used to transmit action information of a game character) is considered as an important data flow, and needs to be preferentially scheduled, because an attack action such as punching or shooting is related to survival of the character. Actions of the game character include the foregoing attack action, a walking action, and the like. The attack action does not always occur, and the character may only walk on a path for most of time. Importance of the walking action is relatively low. If a data flow that includes walking action information is always scheduled based on a high-priority requirement, an air interface resource is wasted, and network experience of another user is affected. In addition, an operator generally uses a charging policy for QoS of a data flow of a high priority. Therefore, scheduling in which the data flow is used as a granularity increases network use costs of a user.

In addition, regardless of a fourth-generation (4G) mobile communication technology and 5G, a QoS policy is applied by a policy control function (PCF) network element for 5G/policy and charging rules function (PCRF) for 4G using an applied server end. An application path is: UE→an application server→an operator PCF/PCRF→an operator core network→an operator access network (base station)→an air interface. This disclosure path is relatively long, and consequently, a delay is caused. When network congestion occurs, the delay is longer.

SUMMARY

Embodiments of this disclosure provide a data transmission method, UE, and a base station, so that air interface scheduling can be performed using a data packet as a granularity.

According to a first aspect, an embodiment of this disclosure provides a data transmission method, and the data transmission method may be applied to a UE. The UE is configured with a first logical channel, and the first logical channel corresponds to a preset first transmission quality requirement. The method includes obtaining a first data packet generated by a first application, where the first application runs on the UE; when the first data packet carries a first identifier, using the first data packet as a to-be-transmitted data packet on the first logical channel, where the first identifier is used to indicate that the first data packet needs to be sent on an air interface based on the first transmission quality requirement; sending a first buffer status report (BSR) to a base station, where the first BSR includes indication information of the first transmission quality requirement, so that the base station allocates a first air interface resource to the first logical channel based on the first transmission quality requirement; and sending the to-be-transmitted data packet on the first logical channel to the base station using the first air interface resource.

In other words, in this embodiment of this disclosure, an application running on the UE may add, to a data packet (such as a data packet that is considered to be relatively important by the application), an identifier used to indicate a transmission quality requirement. When obtaining the data packet from the application, the UE may place the data packet on a logical channel corresponding to the transmission quality requirement, and further send a BSR of the logical channel to the base station, and indication information of the transmission quality requirement is reported in the BSR, so that the base station may allocate an air interface resource to the logical channel based on the transmission quality requirement. Therefore, the UE may send the data packet on the logical channel to the base station based on the air interface resource, so that transmission quality of the data packet on the logical channel is ensured. In this way, scheduling in which a data packet is used as a granularity can be implemented, and uplink transmission quality of a specific data packet (a data packet with an identifier) can be ensured.

In a possible implementation, the UE is configured with a second logical channel, and the second logical channel corresponds to no transmission quality requirement, or a transmission quality requirement corresponding to the second logical channel is lower than the first transmission quality requirement. The method further includes obtaining a second data packet generated by the first application; and when the second data packet does not carry the first identifier, using the second data packet as a to-be-transmitted data packet on the second logical channel.

In other words, in this implementation, an application may not add an identifier to a specific data packet (such as a data packet that is considered as not important by the application). When receiving the data packet from the application, the UE may place the data packet on a logical channel of a relatively low priority (the second logical channel corresponds to no transmission quality requirement or the transmission quality requirement corresponding to the second logical channel is lower than the transmission quality requirement corresponding to the first local channel, and therefore, the second logical channel may be referred to as a low-priority logical channel, and the first logical channel is referred to as a high-priority logical channel), to schedule the data packet in a conventional manner.

In some embodiments, the method further includes sending, when there is no to-be-transmitted data packet on the first logical channel and there is the to-be-transmitted data packet on the second logical channel, a BSR corresponding to the second logical channel to the base station, so that the base station allocates a second air interface resource to the second logical channel; and sending the to-be-transmitted data packet on the second logical channel to the base station using the second air interface resource.

In other words, after all to-be-transmitted data packets on the high-priority logical channel are sent, a BSR of the low-priority logical channel is sent, to request to perform air interface scheduling on the low-priority logical channel. In this way, it can be ensured that the to-be-transmitted data packet on the high-priority logical channel can be preferentially sent.

In a possible implementation, the first data packet and the second data packet belong to a same data flow.

In other words, in this implementation, air interface scheduling may be separately performed on different data packets of a same data flow based on different transmission quality requirements, so that air interface scheduling in which a data packet is used as a granularity is implemented.

In a possible implementation, the first logical channel includes a plurality of channels, the first transmission quality requirement includes a plurality of different transmission quality requirements, channels in the plurality of channels and transmission quality requirements in the different transmission quality requirements are in a one-to-one correspondence, and the first identifier includes a transmission quality requirement identifier. The using the first data packet as a to-be-transmitted data packet on the first logical channel includes determining, from the plurality of channels, a first channel that matches the transmission quality requirement identifier, and using the first data packet as the to-be-transmitted data packet on the first channel.

In other words, in this implementation, the high-priority logical channel may include a plurality of channels, different channels in the plurality of channels correspond to different transmission quality requirements, and the first identifier is information used to identify a transmission quality requirement of a specific channel in the plurality of channels. The first data packet may be placed on the channel corresponding to the first identifier, so that finer air interface scheduling is implemented. In other words, an application may classify a plurality of different data packets into a plurality of data packets of different priorities. The UE may apply for air interface scheduling based on different transmission quality requirements for the plurality of data packets of different priorities, to implement finer air interface scheduling, so that communication experience of a user is further improved.

In a possible implementation, the first BSR is a short BSR medium access control (MAC) control element (CE) (short BSR MAC CE). When the first channel is a channel with a highest transmission quality requirement in non-empty channels, the indication information is a message used to indicate a transmission quality requirement of the first channel, so that the base station allocates an air interface resource to the first channel based on the transmission quality requirement of the first channel. The non-empty channel is a channel with a to-be-transmitted data packet in the plurality of channels.

In other words, in this implementation, when a format of the BSR is a long BSR MAC CE, a BSR of a channel with a highest transmission quality requirement in channels on which the to-be-transmitted data packet is cached may be sent first, so that the channel with the highest transmission quality requirement is preferentially scheduled.

In a possible implementation, the first BSR is a long BSR MAC CE, and the indication information includes information used to indicate a transmission quality requirement of the first channel and information used to indicate a transmission quality requirement of a second channel, so that the base station separately allocates air interface resources to the first channel and the second channel based on the transmission quality requirement of the first channel and the transmission quality requirement of the second channel. The first channel and the second channel are channels with the to-be-transmitted data packet in the plurality of channels.

In other words, in this implementation, the BSR may be in a format of the long BSR MAC CE, so that buffer statuses and transmission quality requirements of a plurality of logical channels may be reported simultaneously.

In a possible implementation, the first BSR includes a logical channel group identity (LCG ID) field, a buffer size field, and a transmission quality requirement indication information field. The indication information is a bit indicator in the transmission quality requirement indication information field.

In other words, in this implementation, the transmission quality requirement indication information field may be added based on a conventional BSR format, and a bit value in the transmission quality requirement indication information field is set, so that the transmission quality requirement indication information field may represent or indicate the transmission quality requirement.

In a possible implementation, the base station is pre-configured with a correspondence between an identifier of the first logical channel and the first transmission quality requirement, and the indication information is the identifier of the first logical channel in the first BSR.

In other words, in this implementation, an identifier (such as a LCG ID) of a logical channel may be pre-configured on a base station side, so that the base station may match, based on the identifier of the logical channel, a transmission quality requirement corresponding to the logical channel. In this way, when reporting a BSR, the UE can report the transmission quality requirement using the identifier of the logical channel without adding a new field to the BSR.

In a possible implementation, the first transmission quality requirement includes a delay requirement and/or a packet error rate requirement.

According to a second aspect, an embodiment of this disclosure provides a data transmission method, including: a base station receives a first BSR from first UE, where the first BSR includes indication information of a first transmission quality requirement, and the first transmission quality requirement is a transmission quality requirement of a first logical channel; and the base station allocates a first air interface resource to the first UE based on the first transmission quality requirement, so that the first UE sends a to-be-transmitted data packet on the first logical channel using the first air interface resource.

In other words, a BSR sent by UE may include the indication information of the transmission quality requirement of the first logical channel, so that the base station can allocate an air interface resource to the UE based on the transmission quality requirement. In this way, the UE can send the to-be-transmitted data packet on the first logical channel using the air interface resource, so that uplink transmission quality of the to-be-transmitted data packet on the first logical channel is ensured, and communication experience of a user is improved.

In a possible implementation, the method further includes: the base station receives a second BSR from second UE, where the second BSR includes indication information of a second transmission quality requirement; and the base station allocates a second air interface resource to the second UE based on the second transmission quality requirement, where when the second transmission quality requirement is lower than the first transmission quality requirement, and a buffer size in the second BSR is equal to a buffer size in the first BSR, there are fewer second air interface resources than the first air interface resource.

In other words, in this implementation, when a transmission quality requirement indicated by indication information in a BSR is relatively low, the base station allocates a relatively small quantity of resources to UE corresponding to the BSR; and when a transmission quality requirement indicated by indication information in a BSR is relatively high, the base station allocates a relatively large quantity of resources to UE corresponding to the BSR. In this way, uplink transmission quality of a data packet of UE with a relatively high transmission quality requirement is ensured, and communication experience of the user is improved.

According to a third aspect, an embodiment of this disclosure provides a data transmission apparatus, and the data transmission apparatus is configured on UE. The UE is configured with a first logical channel, and the first logical channel corresponds to a preset first transmission quality requirement. The apparatus includes an obtaining unit, configured to obtain a first data packet generated by a first application, where the first application runs on the UE; a placement unit, configured to use, when the first data packet carries a first identifier, the first data packet as a to-be-transmitted data packet on the first logical channel, where the first identifier is used to indicate that the first data packet needs to be sent on an air interface based on the first transmission quality requirement; and a sending unit, configured to send a first BSR to a base station, where the first BSR includes indication information of the first transmission quality requirement, so that the base station allocates a first air interface resource to the first logical channel based on the first transmission quality requirement. The sending unit is further configured to send the to-be-transmitted data packet on the first logical channel to the base station using the first air interface resource.

In a possible implementation, the UE is configured with a second logical channel, and the second logical channel corresponds to no transmission quality requirement, or a transmission quality requirement corresponding to the second logical channel is lower than the first transmission quality requirement. The obtaining unit is further configured to obtain a second data packet generated by the first application. The placement unit is further configured to use, when the second data packet does not carry the first identifier, the second data packet as a to-be-transmitted data packet on the second logical channel.

In a possible implementation, the sending unit is further configured to send, when there is no to-be-transmitted data packet on the first logical channel and there is the to-be-transmitted data packet on the second logical channel, a BSR corresponding to the second logical channel to the base station, so that the base station allocates a second air interface resource to the second logical channel. The sending unit is further configured to send the to-be-transmitted data packet on the second logical channel to the base station using the second air interface resource.

In a possible implementation, the first data packet and the second data packet belong to a same data flow.

In a possible implementation, the first logical channel includes a plurality of channels, the first transmission quality requirement includes a plurality of different transmission quality requirements, channels in the plurality of channels and transmission quality requirements in the different transmission quality requirements are in a one-to-one correspondence, and the first identifier includes a transmission quality requirement identifier. The placement unit is further configured to determine, from the plurality of channels, a first channel that matches the transmission quality requirement identifier. The placement unit is further configured to use the first data packet as the to-be-transmitted data packet on the first channel.

In a possible implementation, the first BSR is a short BSR MAC CE. When the first channel is a channel with a highest transmission quality requirement in non-empty channels, the indication information is a message used to indicate a transmission quality requirement of the first channel, so that the base station allocates an air interface resource to the first channel based on the transmission quality requirement of the first channel. The non-empty channel is a channel with a to-be-transmitted data packet in the plurality of channels.

In a possible implementation, the first BSR is a long BSR MAC CE, and the indication information includes information used to indicate a transmission quality requirement of the first channel and information used to indicate a transmission quality requirement of a second channel, so that the base station separately allocates air interface resources to the first channel and the second channel based on the transmission quality requirement of the first channel and the transmission quality requirement of the second channel. The first channel and the second channel are channels with the to-be-transmitted data packet in the plurality of channels.

In a possible implementation, the first BSR includes a LCG ID field, a buffer size field, and a transmission quality requirement indication information field. The indication information is a bit indicator in the transmission quality requirement indication information field.

In a possible implementation, the base station is preconfigured with a correspondence between an identifier of the first logical channel and the first transmission quality requirement, and the indication information is the identifier of the first logical channel in the first BSR.

In a possible implementation, the first transmission quality requirement includes a delay requirement and/or a bit error rate requirement.

It may be understood that the data transmission apparatus provided in the third aspect is configured to perform the corresponding method provided in the first aspect. Therefore, for beneficial effects that can be achieved by the data transmission apparatus, refer to beneficial effects in the corresponding method provided in the first aspect.

According to a fourth aspect, an embodiment of this disclosure provides a data transmission apparatus, including: a receiving unit, configured to receive a first BSR from first UE, where the first BSR includes indication information of a first transmission quality requirement, and the first transmission quality requirement is a transmission quality requirement of a first logical channel; and an allocation unit, configured to allocate a first air interface resource to the first UE based on the first transmission quality requirement, so that the first UE sends a to-be-transmitted data packet on the first logical channel using the first air interface resource.

In a possible implementation, the receiving unit is further configured to receive a second BSR from second UE, and the second BSR includes indication information of a second transmission quality requirement. The allocation unit is further configured to allocate a second air interface resource to the second UE based on the second transmission quality requirement. When the second transmission quality requirement is lower than the first transmission quality requirement, and a buffer size in the second BSR is equal to a buffer size in the first BSR, there are fewer second air interface resources than the first air interface resource.

It may be understood that the data transmission apparatus provided in the fourth aspect is configured to perform the corresponding method provided in the second aspect. Therefore, for beneficial effects that can be achieved by the data transmission apparatus, refer to beneficial effects in the corresponding method provided in the second aspect.

According to a fifth aspect, an embodiment of this disclosure provides UE, including a processor, a memory, and a transceiver. The memory is configured to store computer instructions. When the UE runs, the processor executes the computer instructions, so that the UE performs the method provided in the first aspect.

It may be understood that the UE provided in the fifth aspect is configured to perform the method provided in the first aspect. Therefore, for beneficial effects that can be achieved by the UE, refer to beneficial effects in the method provided in the first aspect.

According to a sixth aspect, an embodiment of this disclosure provides a base station, including a processor, a memory, and a transceiver. The memory is configured to store computer instructions. When the base station runs, the processor executes the computer instructions, so that the base station performs the method provided in the second aspect.

It may be understood that the base station provided in the sixth aspect is configured to perform the method provided in the second aspect. Therefore, for beneficial effects that can be achieved by the base station, refer to beneficial effects in the method provided in the second aspect.

According to a seventh aspect, an embodiment of this disclosure provides a computer storage medium. The computer storage medium includes computer instructions. When the computer instructions are run on an electronic device, the electronic device is enabled to perform the method provided in the first aspect or the method provided in the second aspect.

According to an eighth aspect, an embodiment of this disclosure provides a computer program product. When program code included in the computer program product is executed by a processor in an electronic device, the method provided in the first aspect or the method provided in the second aspect is implemented.

In the data transmission method, the UE, and the base station that are provided in embodiment of this disclosure, air interface scheduling in which a data packet is used as a granularity can be implemented, and an air interface resource can be applied for a data packet with an identifier based on a preset transmission quality requirement, so that uplink transmission quality of the data packet is ensured.

BRIEF DESCRIPTION OF DRAWINGS

FIG. 8 is a flowchart of a data transmission method according to an embodiment of this disclosure;

FIG. 10 is a flowchart of a data transmission method according to an embodiment of this disclosure;

DESCRIPTION OF EMBODIMENTS

Figure 1:
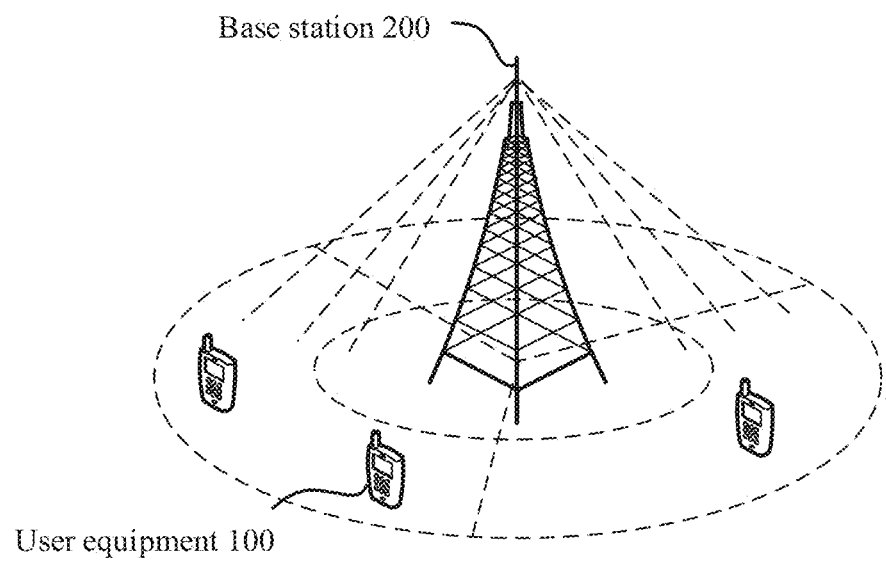
FIG. 1 is a schematic diagram of a wireless communication system according to an embodiment of this disclosure.

The following describes technical solutions of embodiments in this disclosure with reference to accompanying drawings. It is clear that the described embodiments are merely some but not all of embodiments of this disclosure.

In the descriptions of this specification, "an embodiment", "some embodiments", or the like indicates that one or more embodiments of this disclosure include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

In the descriptions of this specification, "I" means "or" unless otherwise specified. For example, AB may represent A or B. In this specification, "and/or" describes only an association relationship between associated objects and represents that three relationships may exist. For example, A and/or B may represent the following three cases: only A exists, both A and B exist, and only B exists. In addition, in the descriptions in embodiments of this disclosure, "a plurality of" means two or more.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "comprise", "have", and their variants all mean "include but are not limited to", unless otherwise specifically emphasized in another manner.

There may be an important data packet and a common data packet in a data flow; in other words, different data packets belonging to a same data flow may have different importance. For example, in a MOBA game, for an action flow, importance of a data packet corresponding to a walking action and importance of a data packet corresponding to an attack action are different. In a video, importance of an I frame and importance of a P frame are also different. Compared with the common data packet, the important data packet needs to be sent as soon as possible. According to a solution, data packets in a same data flow are sequentially sent in a sequence of generation time, and air interface resources allocated by a base station to an important data packet and a common data packet in a same data flow are the same. In this solution, when there is a shortage of air interface resources, the important data packet may not be sent quickly or a sending success rate is relatively low, and consequently, communication experience of a user is poor.

An embodiment of this disclosure provides a data transmission method. A UE may distinguish between an important data packet and a common data packet. The UE may use the important data packet as a to-be-transmitted data packet on an enhanced logical channel (LC), and the enhanced LC is configured with a relatively high transmission quality requirement (the transmission quality requirement may be preset). When the enhanced LC has a to-be-transmitted data packet, the UE may send a BSR to a base station, and the BSR includes the transmission quality requirement of the enhanced LC, so that the base station may allocate an air interface resource to a data packet on the enhanced LC based on the transmission quality requirement; in other words, the base station may schedule the important data packet based on the transmission quality requirement. In this way, air interface scheduling in which a data packet is used as a granularity is implemented, and an air interface resource can be applied for the important data packet based on a specific transmission quality requirement, so that uplink transmission quality of the important data packet is ensured.

The data transmission method provided in this embodiment of this disclosure may be applied to a wireless communication system shown in FIG. 1, and the wireless communication system may include a base station 200 and a plurality of UE.

The base station 200 may be specifically a generation NodeB (gNB) in a 5G mobile communication network (referred to as a 5G network for short below) system, an evolved NodeB (eNB or eNodeB) in a 4G mobile communication network (referred to as a 4G network for short below) system, and a base station in another possible radio access technology.

The plurality of UE may include UE 100 and the like. Subsequently, the UE 100 is used as an example to describe the UE in this embodiment of this disclosure.

The UE 100 includes but is not limited to a mobile phone, a tablet computer (Pad), a computer with a wireless receiving/transmission function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, and the like.

Figure 2:
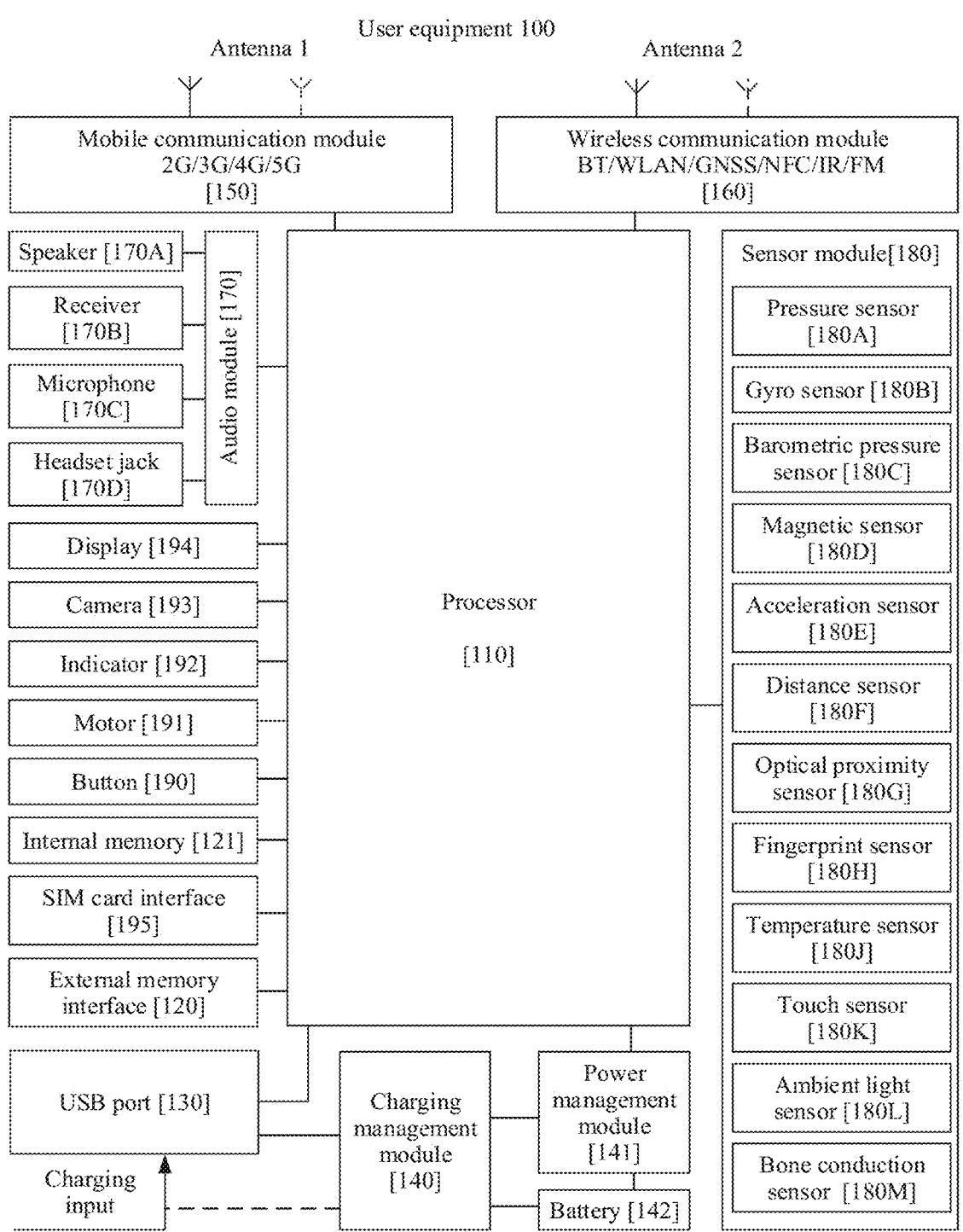
FIG. 2 is a schematic diagram of a hardware structure of UE according to an embodiment of this disclosure.

FIG. 2 is a schematic diagram of a structure of the UE 100.

The UE 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the UE 100. In some other embodiments of this disclosure, the UE 100 may include more or fewer components than those shown in the figure, combine some components, split some components, or have different component arrangements. The components shown in the figure may be implemented by hardware, software, or a combination of software and hardware.

The processor 110 may include an application processor (AP) and a modem.

In some embodiments, the processor 110 may further include one or more of a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or is cyclically used by the processor 110. If the processor 110 needs to use the instructions or the data again, the processor may directly invoke the instructions or the data from the memory. This avoids repeated access, reduces waiting time of the processor 110, and improves system efficiency.

A wireless communication function of the UE 100 may be implemented using the antenna 1, the antenna 2, the mobile communication module 150, the wireless communication module 160, the modem, the baseband processor, and the like.

The antenna 1 and the antenna 2 are configured to transmit and receive an electromagnetic wave signal. Each antenna in the UE 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution for wireless communication including second-generation (2G)/third-generation (3G)/4G/5G and the like applied to the UE 100. The mobile communication module 150 may include at least one filter, a switch, a power amplifier, a low-noise amplifier (LNA), and the like. The mobile communication module 150 may receive an electromagnetic wave using at least two antennas including the antenna 1, perform processing such as filtering and amplification on the received electromagnetic wave, and transmit the electromagnetic wave to the modem for demodulation. The mobile communication module 150 may further amplify a signal modulated by the modem, and convert an amplified signal into an electromagnetic wave through the antenna 1 for radiation. In some embodiments, at least some functional modules in the mobile communication module 150 may be disposed in the processor 110. In some embodiments, at least some functional modules of the mobile communication module 150 may be disposed in a same device as at least some modules of the processor 110.

The modem may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal using an audio device (which is not limited to the speaker 170A, the receiver 170B, and the like), or displays an image or a video on the display 194. In some embodiments, the modem may be an independent device. In some other embodiments, the modem may be independent of the processor 110, and is disposed in the same device as the mobile communication module 150 or another functional module. In other embodiments, the mobile communication module 150 may be a module in the modem.

The wireless communication module 160 may provide a wireless communication solution that is applied to the UE 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the UE 100 are coupled, and the antenna 2 and the wireless communication module 160 in the UE 100 are coupled, so that the UE 100 can communicate with a network and another device using a wireless communication technology. The wireless communication technology may include a Global System for Communication (GSM), a general packet radio service (GPRS), code-division multiple access (CDMA), wideband CDMA (WCDMA), time-division CDMA (TD-SCDMA), Long-Term Evolution (LTE), a 5G, new radio (NR), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or satellite based augmentation systems (SBAS).

Figure 3:
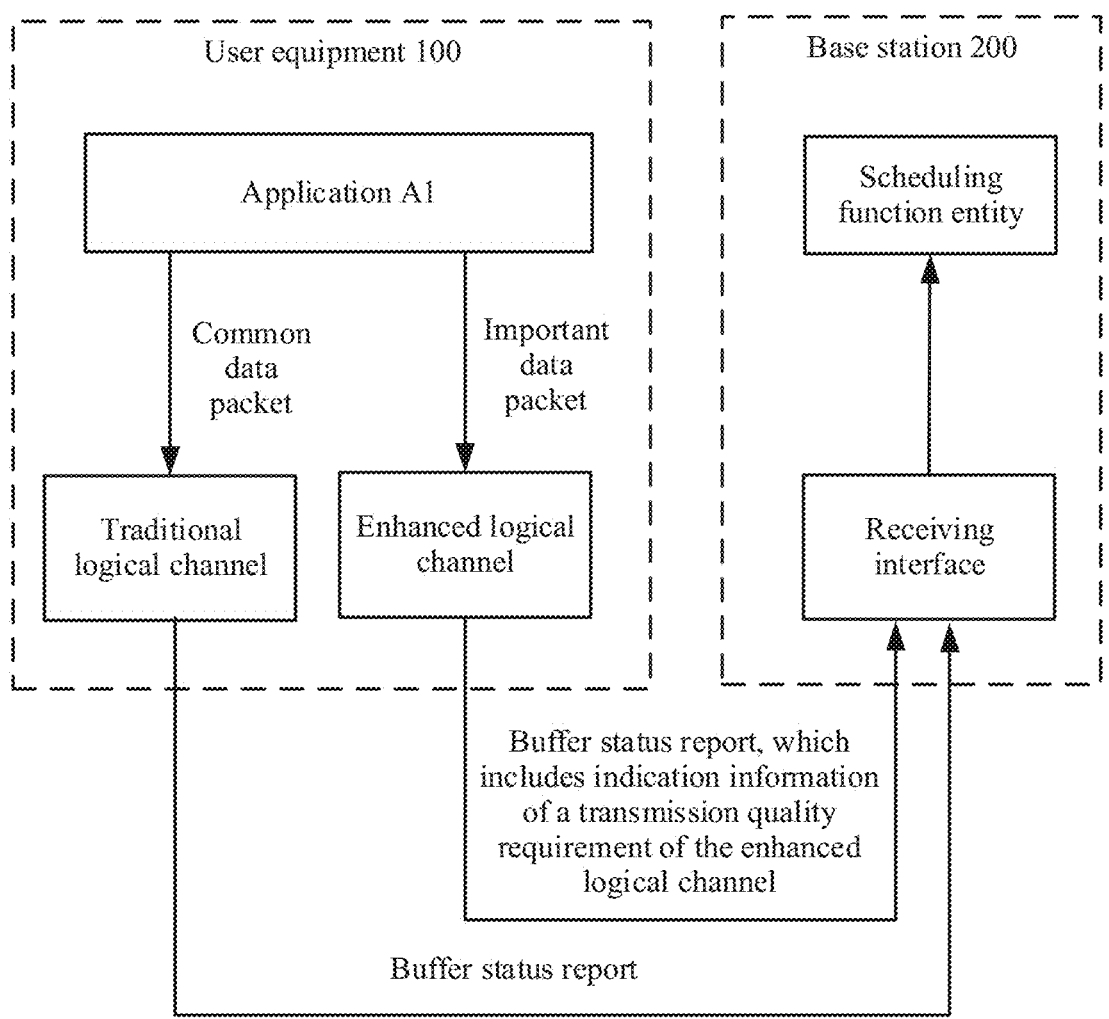
FIG. 3 is a diagram of a system architecture according to an embodiment of this disclosure.

FIG. 3 is a diagram of a system architecture of a data transmission method according to an embodiment of this disclosure.

As shown in FIG. 3, an application A1 may be installed on UE 100. The application A1 may be a game application, such as a MOBA game application or an AR game. The application A1 may alternatively be an instant messaging application. Details are not listed herein one by one. The application A1 may be a system built-in application of the UE 100. The application A1 may alternatively be a third-party application. For example, a user downloads the third-party application from an application market and installs the third-party application, and the user may further uninstall the third-party application. The application A1 is not specifically limited in this embodiment of this disclosure.

As shown in FIG. 3, the application A1 may classify data packets generated by the application A1 into an important data packet and a normal data packet. A manner of determining the important data packet and the common data packet is described below. Compared with the common data packet, the important data packet needs to be sent using an air interface in a timely manner. In other words, time urgency for sending the important data packet using the air interface is higher than that of the common data packet.

A conventional LC and an enhanced LC may be disposed on the UE 100, and the conventional LC and the enhanced LC separately belong to different LC groups (LCG). The enhanced LC may also be referred to as a high-priority LC, and is a LC that is configured in this embodiment of this disclosure and that corresponds to a specific transmission quality requirement. The specific transmission quality requirement may be preset. A manner of representing the transmission quality requirement is specifically described below. The conventional LC corresponds to no transmission quality requirement or corresponds to a relatively low transmission quality requirement (lower than the transmission quality requirement corresponding to the enhanced LC).

The important data packet may be placed on the enhanced LC as a to-be-transmitted packet on the enhanced LC. The common packet may be placed on the conventional LC as a to-be-transmitted packet on the conventional LC.

When there is a to-be-transmitted data packet on the enhanced LC (in other words, the enhanced LC is not empty), the UE 100 may send a BSR corresponding to the enhanced LC to a base station 200. The BSR includes indication information, and the indication information is used to indicate the transmission quality requirement corresponding to the enhanced LC. A specific implementation form of the indication information is specifically described below.

The base station 200 may receive the BSR through a receiving interface, and transfer the BSR to a scheduling function entity of the base station 200, so that the scheduling function entity may allocate an air interface resource to the UE 100 based on the transmission quality requirement corresponding to the enhanced LC. In this way, air interface transmission quality of the important data packet can meet the transmission quality requirement or meets the transmission quality requirement as far as possible. For example, the scheduling function entity may be a MAC entity.

When there is no to-be-transmitted data packet on the enhanced LC (in other words, the enhanced LC is empty), if the conventional LC is not empty, the UE 100 may send a BSR corresponding to the conventional LC to the base station 200. The BSR is a conventional BSR, and does not carry indication information used to indicate a transmission quality requirement. Therefore, when allocating an air interface resource, the base station 200 does not need to take the transmission quality requirement of the conventional LC into consideration. Therefore, when the base station simultaneously allocates air interface resources to the plurality of pieces of UE including the UE 100, if a BSR sent by another piece of UE other than the UE 100 includes the indication information used to indicate the transmission quality requirement, the base station may preferentially allocate the air interface resource to the another piece of UE, to preferentially schedule an important data packet in the another piece of UE.

A concept of the data transmission method provided in this embodiment of this disclosure is described above with reference to FIG. 3. Subsequently, an implementation solution of the data transmission method provided in this embodiment of this disclosure is described using examples in different embodiments.

In the following descriptions, the UE 100 is used as an example to describe an implementation solution, on a UE side, of the data transmission method provided in this embodiment of this disclosure.

Figure 4A:
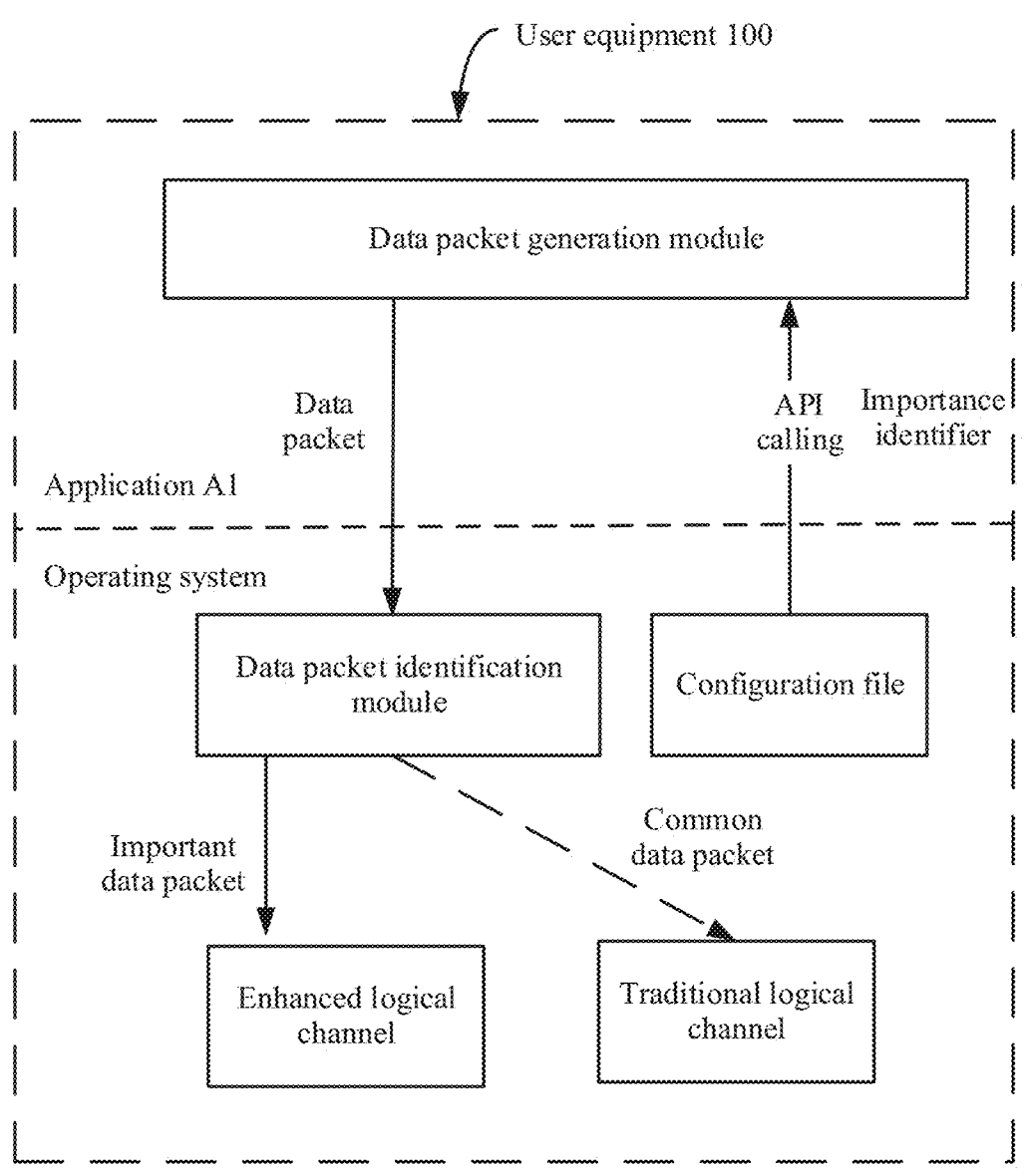
FIG. 4A is a schematic diagram of a software structure of UE according to an embodiment of this disclosure.

FIG. 4A is a schematic diagram of a software structure of the UE 100. As shown in FIG. 4A, the UE 100 may be configured with an enhanced LC and a conventional LC. As described above, the enhanced LC is a configured LC corresponding to a preset transmission quality requirement. For example, the transmission quality requirement corresponding to the enhanced LC may include a delay requirement. For example, a delay is less than 5 milliseconds (ms), or a delay is between 5 ms and 10 ms. For example, the transmission quality requirement corresponding to the enhanced LC may include a bit error rate requirement. For example, a bit error rate needs to be converged to $10^{-6}$. For example, the transmission quality requirement corresponding to the enhanced LC may include a delay requirement and a bit error rate requirement. Details are not listed herein one by one. In specific implementation, the transmission quality requirement corresponding to the enhanced LC may be set based on experience or experiments.

The conventional LC corresponds to no transmission quality requirement, or is a configured LC corresponding to a relatively low transmission quality requirement (lower than the transmission quality requirement corresponding to the enhanced LC).

An important data packet generated by the application A1 may be placed on the enhanced LC as a to-be-transmitted data packet on the enhanced LC, so that when applying for uplink scheduling, the base station may allocate an air interface resource to the important data packet based on the transmission quality requirement of the enhanced LC, to ensure uplink transmission quality and preferential sending of the important data packet.

Subsequently, a solution of determining the important data packet is described using an example.

Continue to refer to FIG. 4A. The application A1 may include a data packet generation module. In a running process of the application A1, the data packet generation module may run related data based on the application A1 to generate a data packet.

For example, the application A1 may be set to a MOBA game application, and may generate a data packet in response to a game operation of the user. For example, the user may touch a "walking" functional area to control a game character to walk on a path, and the application A1 may generate a data packet in response to the user's operation of touching the "walking" functional area. For another example, the user may touch an "attack" functional area to control a game character to make an attack, and the application A1 may generate a data packet in response to the user's operation of touching the "attack" functional area.

For example, the application A1 may be set to an instant messaging application. During a video call of the application A1, the application A1 may generate a video data flow. Each video frame in the video data flow may be referred to as a data packet.

In some embodiments, when generating the data packet, the data packet generation module may determine, based on characteristic information of the data packet, whether the data packet is an important data packet.

For example, the data packet may be a data packet generated by the application A1 in response to an operation of the user. The application A1 may determine, based on a functional area in which the operation works, whether the data packet is an important data packet. In other words, the characteristic information of the data packet may be information used to represent the functional area. It may be understood that a functional area of an application is a virtual key on an application interface, and a touch operation performed on the virtual key may trigger the application to generate a response, for example, generate a data packet. A developer or a designer of the application A1 may preset an important functional area, and set, to an important data packet, a data packet triggered by an operation performed on the important functional area, that is, set, to an important data packet, a data packet generated by the application A1 in response to the operation performed on the important functional area. For example, a developer of a game application may set an attack launching functional area such as "attack", "shoot", or "slide tackle" to an important functional area, and set another functional area to a common functional area.

For example, a developer of a payment application may set a functional area such as "confirm to pay" used to trigger a payment procedure to an important functional area, and set another functional area to a common functional area. Selection of the important functional area is not described herein. In specific implementation, a developer of the application may choose, based on experience or experiments, to set one or more functional areas on a running interface of the application to important functional areas.

A data packet generated by the application A1 when being triggered by an operation performed on the important functional area may be determined as the important data packet by the application A, and a data packet generated by the application A1 when being triggered by an operation performed on the common functional area may be determined as the common data packet by the application A.

For example, a data packet of a type of a video frame may be divided into an I frame and a P frame. The I frame is a key frame, and during decoding, only data of a current frame is required to generate a complete picture. The P frame does not include complete picture data, and during decoding, data of a previous frame needs to be used to generate complete picture data. Therefore, the I frame is more important than the P frame, and may be determined as the important data packet. Information used to indicate a specific type of frame of the data packet may be referred to as characteristic information of the data packet. Specifically, information indicating that the data packet is the I frame may be referred to as characteristic information of the I frame, and information indicating that the data packet is the P frame may be referred to as characteristic information of the P frame.

It should be noted that the solution for determining the important data packet is described above using an example, and is not limited to the foregoing solution. In another embodiment, another solution may also be used to determine the important data packet. Details are not listed one by one herein.

It may be understood that whether a data packet is an important data packet may be determined based on characteristic information (for details, refer to the descriptions above) of a data packet layer of the data packet, instead of being determined based on information at a data flow layer. Therefore, the important data packet and the common data packet may belong to a same data flow.

It may be understood that the important data packet needs to be sent on an air interface in a timely and high-quality manner. Therefore, the application A1 may add an importance identifier to the important data packet. The importance identifier is used to indicate that a data packet that carries the importance identifier needs to be sent on an air interface based on a relatively high transmission quality requirement.

As shown in FIG. 4A, a configuration file may be preset in an operating system of the UE 100, and the configuration file may be configured with an importance identifier. There may be a correspondence between the importance identifier and the transmission quality requirement of the enhanced LC. In other words, the importance identifier may indicate that a data packet that carries the importance identifier needs to be sent on an air interface based on the transmission quality requirement of the enhanced LC. For example, the importance identifier may be a preset bit string. After determining an important data packet, the data packet generation module may obtain the importance identifier in the configuration file by invoking an application programming interface (API), and add the importance identifier to the important data packet. For example, when the operating system of the UE 100 is an Android® operating system, a method setPriority ( ) may be added to a class HttpURL-Connection, so that the application A1 may invoke the method to add the importance identifier to the important data packet.

In some embodiments, the configuration file in the operating system may further include important data packet recommendation information. Specifically, the important data packet recommendation information may include a plurality of data packet types. For example, the plurality of data packet types may include a data packet of a self-driving service generated when a driving speed is greater than 60 kilometers per hour (km/h), a data packet of an attack action in an AR game or a MOBA game, and a data packet of an intelligent transportation service in a preset time period (such as rush hour). It may be understood that these types of data packets are relatively important and need to be transmitted in a timely and high-quality manner.

When generating the data packet, the data packet generation module of the application A1 may view the important data packet recommendation information in the configuration file by invoking the API, and determine whether the data packet generated by the data packet generation module belongs to one of the foregoing plurality of data packet types. If the data packet generated by the data packet generation module belongs to one of the foregoing plurality of data packet types, the data packet generation module may determine the data packet generated by the data packet generation module as an important data packet, and add the importance identifier to the data packet.

Continue to refer to FIG. 4A. The application A1 may transfer the data packet generated by the application A1 to the operating system of the UE 100. The operating system may be configured with a data packet identification module. The data packet identification module may identify whether a data packet received from the application A1 is an important data packet. As described above, when the data packet carries the importance identifier, the data packet identification module may identify the data packet as an important data packet; and when the data packet does not carry the importance identifier, the data packet identification module may identify the data packet as a common data packet.

For example, the data packet identification module may be an Internet protocol (IP) stack. The IP stack may be configured to parse the data packet and detect whether the data packet carries the importance identifier.

In the operating system, whether the data packet received from the application A1 is an important data packet or a common data packet may be identified using the data packet identification module. When the data packet is an important data packet, the operating system may place the data packet on the enhanced LC, so that the data packet is used as a to-be-transmitted data packet on the enhanced LC. When the data packet is a common data packet, the operating system may place the data packet on the conventional LC, so that the data packet is used as a to-be-transmitted data packet on the conventional LC.

When there is a to-be-transmitted data packet on the LC, the UE 100 may send a BSR to the base station 200. A BSR corresponding to the enhanced LC may include indication information, and the indication information is used to indicate the transmission quality requirement corresponding to the enhanced LC. The BSR in this embodiment of this disclosure is specifically described below.

Figure 4B:
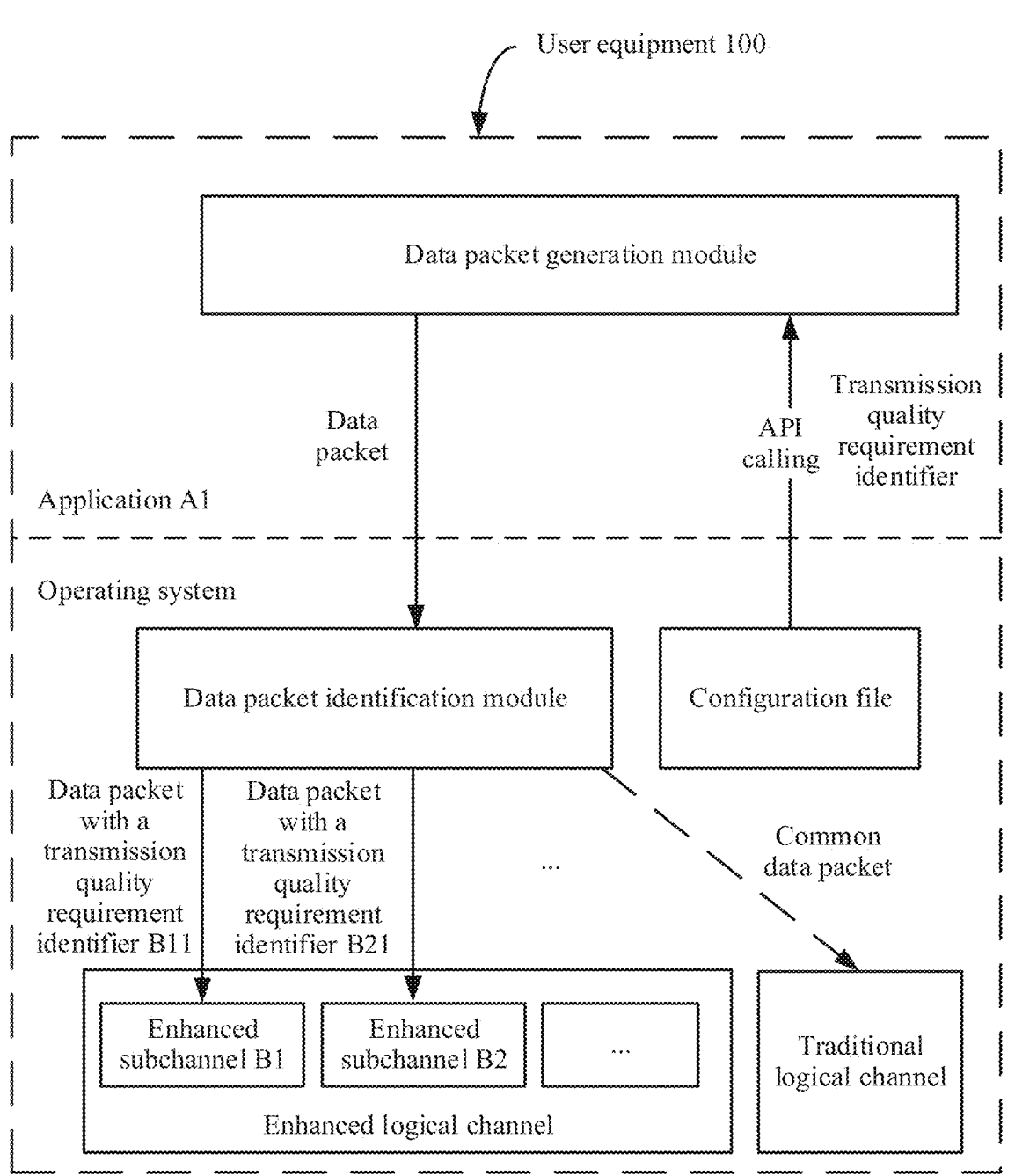
FIG. 4B is a schematic diagram of a software structure of UE according to an embodiment of this disclosure.

FIG. 4B is a schematic diagram of another software structure of the UE 100. As shown in FIG. 4B, the UE 100 may be configured with an enhanced LC and a conventional LC. As described above, the enhanced LC is a configured LC corresponding to a preset transmission quality requirement. The conventional LC corresponds to no transmission quality requirement, or is a configured LC corresponding to a relatively low transmission quality requirement (lower than the transmission quality requirement corresponding to the enhanced LC).

As shown in FIG. 4B, the enhanced LC may include a plurality of LCs, and different LCs in the plurality of LCs respectively correspond to different transmission quality requirements. A transmission quality requirement corresponding to each LC may be preset. For ease of description, in this embodiment of this disclosure, a LC in the plurality of LCs may be referred to as an enhanced sub-channel. Specifically, as shown in FIG. 4B, the enhanced LC may include an enhanced sub-channel B1, an enhanced sub-channel B2, and the like. A transmission quality requirement corresponding to the enhanced sub-channel B1 is different from a transmission quality requirement corresponding to the enhanced sub-channel B2. For example, the enhanced LC may specifically include eight enhanced sub-channels, and different enhanced sub-channels correspond to different transmission quality requirements.

It should be noted that different enhanced sub-channels respectively belong to different LCGs.

The UE 100 may be configured a plurality of transmission quality requirement identifiers, and transmission quality requirement identifiers in the plurality of transmission quality requirement identifiers may be in a one-to-one correspondence with transmission quality requirements of the enhanced sub-channels in the enhanced LC.

For example, the transmission quality requirement identifier may be a bit string of 3 bits, and transmission quality requirement identifiers corresponding to different transmission quality requirements are obtained by setting bit values at different locations in the bit string.

Continue to refer to FIG. 4B. A configuration file may be pre-configured in an operating system. The configuration file may include the foregoing plurality of transmission quality requirement identifiers and a transmission quality requirement corresponding to each of the plurality of transmission quality requirement identifiers. For example, the configuration file may further include data packet types that are suitable for or match different transmission quality requirements. For example, the configuration file may be shown in Table 1. In Table 1, the transmission quality requirement identifier is represented using a bit string of 3 bits, and the transmission quality requirement is represented using a delay and a bit error rate.

TABLE 1

| Configuration File | | | | | |
| Transmission quality requirement identifier | | | Transmission quality requirement | | |
| Bit 2 | Bit 1 | Bit 0 | Delay (ms) | Bit error rate | Example of a data packet type |
| --- | --- | --- | --- | --- | --- |
| 0 | 0 | 0 | 5 | $10^{-6}$ | Data packet of a self-driving service generated when a driving speed is greater than 60 km/h |
| 0 | 0 | 1 | 8 | $10^{-6}$ | Data packet of an attack action in an AR game or a MOBA game |
| 0 | 1 | 0 | 3 | $10^{-5}$ | Data packet of a high-voltage monitoring service in bad weather |
| 0 | 1 | 1 | 25 | $10^{-5}$ | Data packet of an intelligent transportation service within a preset time period (such as rush hour) |
| 1 | 0 | 0 | 9 | $10^{-4}$ | Distributed automation control information |
| 1 | 0 | 1 | 9 | $10^{-4}$ | Distributed automation maintenance information |
| 1 | 1 | 0 | 20 | $10^{-4}$ | Data packet generated by a payment operation |
| 1 | 1 | 1 | 10 | $10^{-3}$ | I frame of a video when frame freezing occurs during play of the video |

Continue to refer to FIG. 4B. The application A1 may include a data generation module. The data generation module may generate a data packet. For details, refer to the foregoing descriptions of the embodiment shown in FIG. 4A.

When generating the data packet, the data generation module may access the configuration file by invoking an API, check and select the transmission quality requirement, and add a transmission quality requirement identifier corresponding to the selected transmission quality requirement to the generated data packet. For example, the data generation module may check data packet types that are suitable for or match different transmission quality requirements, and determine a data packet type to which the currently generated data packet belongs. Therefore, a transmission quality requirement that is suitable for or matches the currently generated data packet may be determined, and further, a transmission quality requirement identifier corresponding to the transmission quality requirement may be added to the currently generated data packet.

That the data generation module adds the transmission quality requirement identifier to the data packet indicates that the application A1 expects the UE 100 to transmit the data packet based on the transmission quality requirement corresponding to this instruction-level identifier. Therefore, the transmission quality requirement identifier may be considered as an importance identifier. In other words, the transmission quality requirement identifier is also the importance identifier.

It should be noted that the data packet generation module may alternatively not add any transmission quality requirement identifier to the currently generated data packet; in other words, the application A1 may not specifically require transmission quality of the currently generated data packet.

Continue to refer to FIG. 4B. The application A1 may transfer the data packet to a data packet identification module in the operating system. The data packet identification module identifies whether the data packet carries a transmission quality requirement identifier.

If the data packet does not carry the transmission quality requirement identifier, the data packet identification module places the data packet on the conventional LC, so that the data packet is used as a to-be-transmitted data packet on the conventional LC.

If the data packet carries the transmission quality requirement identifier, the data packet identification module may place the data packet on an enhanced sub-channel corresponding to the transmission quality requirement identifier based on a correspondence between the transmission quality requirement identifier and the enhanced sub-channel. For example, the data packet carries a transmission quality requirement identifier B11, and the transmission quality requirement identifier B11 corresponds to an enhanced sub-channel B1. Therefore, the data packet identification module may place the data packet on the enhanced sub-channel B1, so that the data packet is used as a to-be-transmitted data packet on the enhanced sub-channel B1.

A solution for separately placing data packets of different importance on LCs with different transmission quality requirements is described above with reference to FIG. 4A and FIG. 4B using an example. When there is a to-be-transmitted data packet on a LC of the UE, the UE may send a BSR to the base station, to request the base station to allocate an air interface resource to the UE.

Subsequently, the BSR and a solution for sending the BSR in this embodiment of this disclosure are described using examples in different embodiments.

The BSR may include an identifier of the LC, to indicate a specific LC whose buffer status is reported in the BSR. For example, the identifier of the LC may be a LCG ID of the LC.

The enhanced LC and the conventional LC in the embodiment shown in FIG. 4A and the enhanced sub-channel and the conventional LC in the embodiment shown in FIG. 4B may be collectively referred to as the LC, or all belong to the LC.

In some embodiments, the BSR used in this embodiment of this disclosure may be a short BSR MAC CE.

Figures 5A, 5B, 6A:
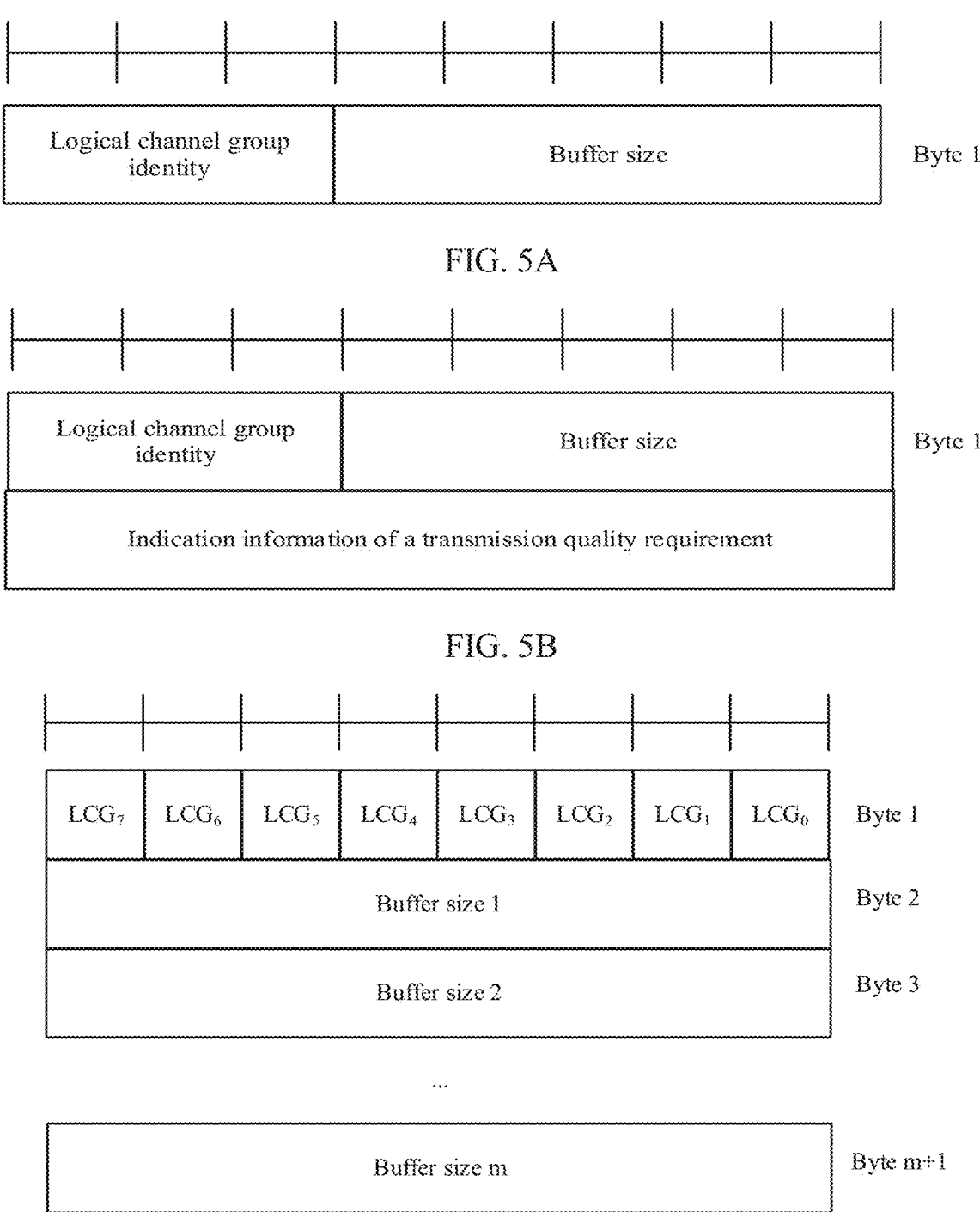
FIG. 5A is a schematic diagram of a structure of a conventional short BSR MAC CE according to an embodiment of this disclosure.
FIG. 5B is a schematic diagram of a structure of an enhanced short BSR MAC CE according to an embodiment of this disclosure.
FIG. 6A is a schematic diagram of a structure of a conventional long BSR MAC CE according to an embodiment of this disclosure.

FIG. 5A shows a structure of a conventional short BSR MAC CE. As shown in FIG. 5A, a length of the conventional short BSR MAC CE is one byte (Oct), and the conventional short BSR MAC CE includes a LCG ID field and a buffer size field.

In this embodiment of this disclosure, when sending the BSR corresponding to the conventional LC, the UE may send the conventional short BSR MAC CE. A group identity of a LCG to which the conventional LC belongs may be filled in the LCG ID field, and a buffer data amount in the conventional LC may be filled in the buffer size field.

FIG. 5B shows a structure of an enhanced short BSR MAC CE. As shown in FIG. 5B, the enhanced short BSR MAC CE includes a LCG ID field, a buffer size field, and a transmission quality requirement indication information field. In other words, the enhanced short BSR MAC CE is obtained based on a conventional BSR MAC CE.

In this embodiment of this disclosure, the conventional short BSR MAC CE and the enhanced short BSR MAC CE may be collectively referred to as a short BSR MAC CE.

In some embodiments, when sending the BSR corresponding to the enhanced LC shown in FIG. 4A, the UE may send the enhanced short BSR MAC CE. A group identity of a LCG to which the enhanced LC belongs may be filled in the LCG ID field, a buffer data amount in the enhanced LC may be filled in the buffer size field, and indication information of a transmission quality requirement corresponding to the enhanced LC may be filled in the transmission quality requirement indication information field. For example, the indication information of the transmission quality requirement may be pre-agreed on by the UE and the base station, and can represent information about the transmission quality requirement corresponding to the enhanced LC, for example, may be a specific bit string. For example, a transmission quality requirement represented by a bit string "000" may be set as follows: a delay is less than 5 ms, and a bit error rate is less than 10'. For example, the indication information of the transmission quality requirement may be a transmission quality requirement identifier corresponding to the transmission quality requirement.

When sending the BSR corresponding to the enhanced sub-channel shown in FIG. 4B, the UE may send the enhanced short BSR MAC CE. A group identity of a LC group to which the enhanced sub-channel belongs may be filled in the LCG ID field, a buffer data amount in the enhanced sub-channel may be filled in the buffer size field, and indication information of a transmission quality requirement corresponding to the enhanced sub-channel may be filled in the transmission quality requirement indication information field. For example, indication information of the transmission quality requirement may be pre-agreed on by the UE and the base station, and can represent information about the transmission quality requirement corresponding to the enhanced sub-channel. A correspondence between the indication information and a transmission quality requirement represented by the indication information is stored on a base station side. For example, the indication information of the transmission quality requirement may be a specific bit string. In other words, the indication information of the transmission quality requirement may be bit indication information. For example, a transmission quality requirement represented by a bit string "000" may be set as follows: a delay is less than 5 ms, and a bit error rate is less than $10^{-6}$. For example, the indication information of the transmission quality requirement may be a transmission quality requirement identifier corresponding to the transmission quality requirement.

In some embodiments, the BSR of the enhanced LC (or the enhanced sub-channel) may alternatively be the conventional short BSR MAC CE. In this embodiment, the enhanced LC (or the enhanced sub-channel) has a fixed LCG ID, and a correspondence between a LCG ID and a transmission quality requirement may be pre-configured on the base station side. When receiving the BSR, the base station may determine, based on a LCG ID in the BSR using the correspondence between a LCG ID and a transmission quality requirement, whether the BSR corresponds to the transmission quality requirement. When the BSR corresponds to the transmission quality requirement, an air interface resource may be allocated to the UE based on the transmission quality requirement.

Subsequently, a sequence of sending BSRs of different channels when the BSR is the short BSR MAC CE is described using examples.

For example, in the embodiment shown in FIG. 4A, when there is the to-be-transmitted data packet on the enhanced LC, and there is no or there is the to-be-transmitted data packet on the conventional LC, the UE 100 may send the BSR of the enhanced LC to the base station 200. In other words, when there is the to-be transmitted data packet on both the enhanced LC and the conventional LC, the UE 100 may first send the BSR of the enhanced LC, to preferentially schedule the to-be-transmitted data packet on the enhanced LC. When there is no to-be-transmitted data packet on the enhanced LC and there is the to-be-transmitted data packet on the conventional LC, the UE 100 may send the conventional short BSR MAC CE to the base station 200.

For example, in the embodiment shown in FIG. 4B, when there is the to-be-transmitted data packet on the enhanced sub-channel, and there is no or there is the to-be-transmitted data packet on the conventional LC, the UE 100 may send the BSR of the enhanced sub-channel to the base station 200. For example, when there is the to-be-transmitted data packet on a plurality of enhanced sub-channels, BSRs may be sequentially sent based on transmission quality requirements corresponding to the plurality of enhanced sub-channels. A BSR of an enhanced sub-channel with a highest transmission quality requirement is sent first; and then, a BSR of an enhanced sub-channel with a second highest transmission quality requirement is sent; and so on. A BSR of the conventional LC with the to-be-transmitted data packet is not sent until BSRs of all enhanced sub-channels with the to-be-transmitted data packet are sent.

In some embodiments, the BSR used in this embodiment of this disclosure may be a long BSR MAC CE.

FIG. 6A shows a structure of a conventional long BSR MAC CE. In the long BSR MAC CE, a LCG ID may be represented by three consecutive bits. Therefore, a maximum of eight LCG identities can be written to a first byte (byte 1) of the long BSR MAC CE. In other words, when the BSR uses the long BSR MAC CE, buffer statuses of a maximum of eight LCs may be simultaneously reported in one BSR. It may be understood that, for one piece of UE, LCs configured by the UE or LCs simultaneously having the to-be-transmitted data packet generally have no more than eight pieces of data. Therefore, the long BSR MAC CE may simultaneously buffer statuses of all the LCs with the to-be-transmitted data packet.

In this embodiment of this disclosure, when sending the BSR corresponding to the conventional LC, the UE may send the conventional long BSR MAC CE. Three consecutive bits (such as bits corresponding to an $LCG_0$) in the byte 1 may be filled with a group identity of a LCG to which the conventional LC belongs (other bits in the byte 1 are not filled), and a corresponding buffer size field may be filled with a buffer data amount in the conventional LC.

Figure 6B:
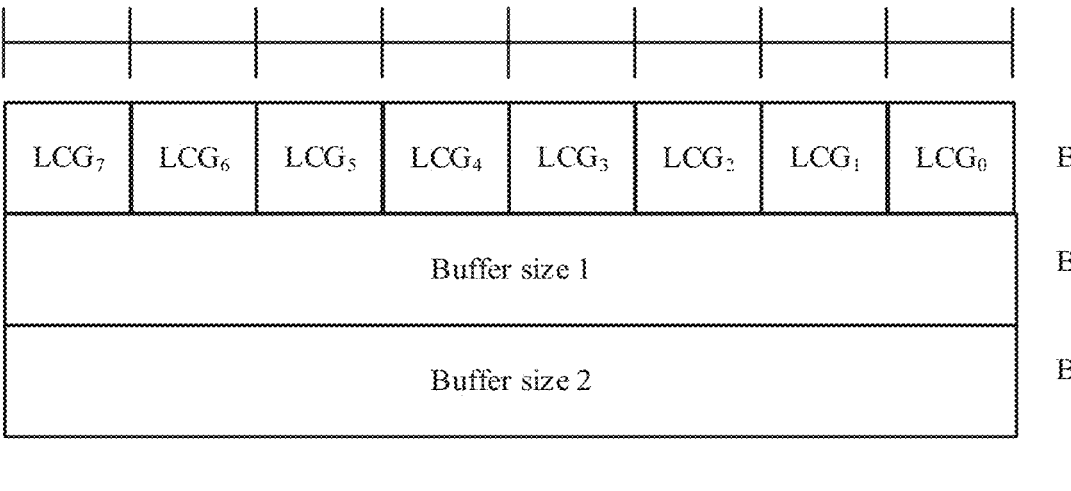
FIG. 6B is a schematic diagram of a structure of an enhanced long BSR MAC CE according to an embodiment of this disclosure.

FIG. 6B shows a structure of an enhanced conventional long BSR MAC CE. The structure of the enhanced conventional long BSR MAC CE shown in FIG. 6B is obtained by adding a transmission quality requirement indication information field to the structure of the conventional long BSR MAC CE.

In this embodiment of this disclosure, the conventional long BSR MAC CE and the enhanced long BSR MAC CE may be collectively referred to as a long BSR MAC CE.

In some embodiments, when sending the BSR corresponding to the enhanced LC shown in FIG. 4A, the UE may send the enhanced long BSR MAC CE. Three consecutive bits (such as bits corresponding to an $LCG_0$) in the byte 1 may be filled with a group identity of a LCG to which the enhanced LC belongs (other bits in the byte 1 are not filled), a corresponding buffer size field may be filled with a buffer data amount in the enhanced LC, and the transmission quality requirement indication information field may be filled with indication information of the transmission quality requirement corresponding to the enhanced LC. For example, the indication information of the transmission quality requirement may be pre-agreed on by the UE and the base station, and can represent information about the transmission quality requirement corresponding to the enhanced LC, for example, may be a specific bit string. For example, a transmission quality requirement represented by a bit string "000" may be set as follows: A delay is less than 5 ms, and a bit error rate is less than 10'.

In some embodiments, when sending the BSR corresponding to the enhanced sub-channel shown in FIG. 4B, the UE may send the enhanced long BSR MAC CE.

For example, when there is the to-be-transmitted data packet on one enhanced sub-channel, the enhanced long BSR MAC CE may report a buffer status of the enhanced sub-channel. Specifically, three consecutive bits (such as bits corresponding to an $LCG_0$) in the byte 1 may be filled with a group identity of a LCG to which the enhanced sub-channel belongs (other bits in the byte 1 are not filled), a corresponding buffer size field may be filled with a buffer data amount in the enhanced sub-channel, and the transmission quality requirement indication information field may be filled with indication information of a transmission quality requirement corresponding to the enhanced sub-channel.

For example, when there is the to-be-transmitted data packet on two or more enhanced sub-channels, the enhanced long BSR MAC CE may report buffer statuses of the two or more enhanced sub-channels. Specifically, three consecutive bits (such as bits corresponding to an $LCG_0$) in the byte 1 may be filled with a group identity of a LCG to which one of the enhanced sub-channels belongs, other three consecutive bits (such as bits corresponding to an $LCG_1$) may be filled with a group identity of a LCG to which another enhanced sub-channel belongs, and so on, until group identities of LCGs to which the two or more enhanced sub-channels belong are filled into the byte 1. A corresponding buffer size field is filled with a buffer data amount in the enhanced sub-channel. A corresponding location in the transmission quality requirement indication information field is filled with indication information of a transmission quality requirement corresponding to the enhanced sub-channel. Specifically, a location (or a ranking), in the transmission quality requirement indication information field, of indication information of a transmission quality requirement corresponding to an enhanced sub-channel is consistent with a location (or a ranking), in the byte 1, of a group identity of a LCG to which the enhanced sub-channel belongs. Therefore, when receiving the enhanced long BSR MAC CE, the base station may learn the transmission quality requirement of the enhanced sub-channel indicated by the LCG ID.

For example, the indication information of the transmission quality requirement may be pre-agreed on by the UE and the base station, and can represent information about the transmission quality requirement corresponding to the enhanced LC, for example, may be a specific bit string. For example, a transmission quality requirement represented by a bit string "000" may be set as follows: a delay is less than 5 ms, and a bit error rate is less than $10^{-6}$. For example, the indication information of the transmission quality requirement may be a transmission quality requirement identifier corresponding to the transmission quality requirement.

For example, in this embodiment, a size of the transmission quality requirement indication information field may be dynamically set based on a quantity of enhanced sub-channels reported by the enhanced long BSR MAC CE. For example, the indication information of the transmission quality requirement is a bit string of 3 bits. When the enhanced long BSR MAC CE reports one enhanced sub-channel, a size of the transmission quality requirement indication information field in the enhanced long BSR MAC CE is 3 bits; when the enhanced long BSR MAC CE reports two enhanced sub-channels, the size of the transmission quality requirement indication information field in the enhanced long BSR MAC CE is 6 bits; and so on. In other words, when the quantity of enhanced sub-channels reported by the enhanced long BSR MAC CE is directly proportional to the size of the transmission quality requirement indication information field in the enhanced long BSR MAC CE.

Figure 6C:
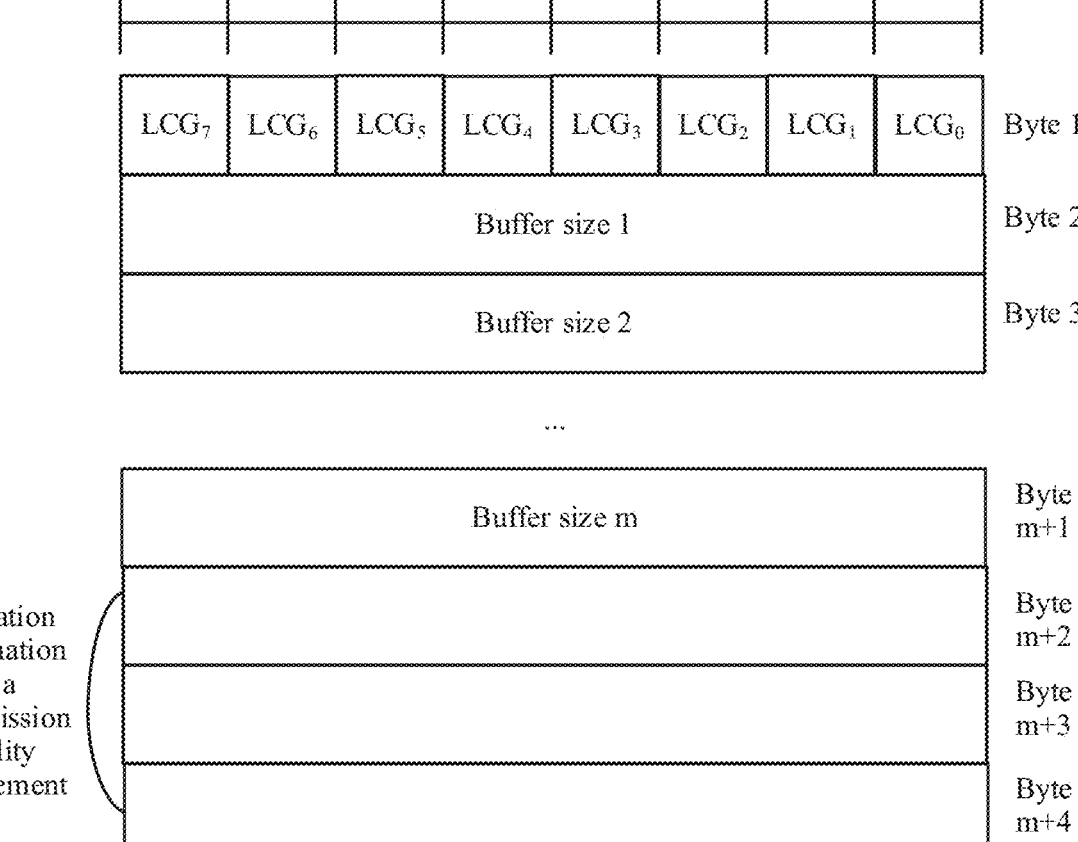
FIG. 6C is a schematic diagram of a structure of an enhanced long BSR MAC CE according to an embodiment of this disclosure.

In a specific example, as shown in FIG. 6C, the quantity of enhanced sub-channels reported by the enhanced long BSR MAC CE may be set to 8, and in this case, three bytes (a byte m+2, a byte m+3, and a byte m+4) may be added to the enhanced long BSR MAC CE, to be used as the transmission quality requirement indication information field. In this way, the transmission quality requirement indication information field may be 24 bytes in size, and can be filled with indication information of a transmission quality requirement corresponding to each enhanced sub-channel.

Therefore, in the foregoing solution, the enhanced long BSR MAC CE may be used to report the indication information of the transmission quality requirement of the enhanced LC or the enhanced sub-channel to the base station.

In some embodiments, the BSR of the enhanced LC (or the enhanced sub-channel) may alternatively be the conventional long BSR MAC CE. In this embodiment, the enhanced LC (or the enhanced sub-channel) has a fixed LCG ID, and a correspondence between a LCG ID and a transmission quality requirement may be pre-configured on the base station side. When receiving the BSR, the base station may determine, based on a LCG ID in the BSR using the correspondence between a LCG ID and a transmission quality requirement, whether the BSR corresponds to the transmission quality requirement. When the BSR needs to correspond to the transmission quality requirement, an air interface resource may be allocated to the UE based on the transmission quality requirement. Details are described below.

In a specific example, attribute configuration may be added to the base station side in the following code:

```
"SRB-ToAddMod ::=        SEQUENCE  {
     srb-Identity             INTEGER(1. . 2),
     rlc-Config               CHOICE  {
     explicitValue                RLC-Config,
     defaultValue             NULL
        }  OPTIONAL,                     --  Cond Setup
logicalChannelConfig     CHOICE  {
     explicitValue                LogicalChannelConfig,
     defaultValue             NULL
        }  OPTIONAL,                     --  Cond Setup
        ...
}
DRB-ToAddMod ::=        SEQUENCE  {
   eps-BearerIdentity        INTERGER(0..15)         OPTIONAL,       -- Cond RB-Setup
   drb-Identity              DRB-Identity,
   pdcp-Config               PDCP-Config             OPTIONAL,--     Cond PDCP
   rlc-Config                RLC-Config              OPTIONAL,--     Cond Setup
     logicalChannelIdentity     INTEGER(3..10)         OPTIONAL,       -- Cond RB-Setup
logicalChannelConfig                               OPTIONAL, -- Cond Setup
     ...
}"
```

Specifically, two fields "logicalChannelDelay" and "logicalChannelPER" may be added to an attribute "LogicalChannelConfig". A specific code is as follows:

```
"LogicalChannelConfig :: =                SEQUENCE  {
     ul-SpecificPararmeters               SEQUENCE  {
priority                    INTEGER (1 .. 16),
priotitisedBitRate                   ENUMERATED  {
     kBps0, kBps8, kBps16, kBps32, kBps64, kBps128, kBps256,
infinity,spare8,spare7,spare6,spare5,spare4,spare3, spare2, spare1},
bucketSizeDuration                   ENUMERATED  {
                       ms50, ms100, ms150, ms300, ms500, ms1000, spare2, spare1},
logicalChannelGroup               INTEGER (0 .. 7)        OPTIONAL--   Need OR
logicalChannelDelay               ENUMERATED  {
                       ms0, ms5, ms10, ms15, ms20, ms25, ms30, ms50, ms75,
                       ms100, ms150, ms200, ms300},
logicalChannelPER                ENUMERATED  {
           10⁻⁶ , 10⁻⁵ , 10⁻⁴ , 10⁻³ ,10⁻² , 10⁻¹ },
        }                  OPTIONAL,              --   Cond UL
     ...,
}"
```

"logicalChannelDelay" represents a delay requirement of the LC. For example, ms0 represents a delay that is less than 5 ms, and ms5 represents a delay that is between 5 ms and 10 ms.

"logicalChannelPER" represents a bit error rate requirement of the LC. For example, $10^{-6}$ represents that a bit error rate needs to be converged to $10^{-6}$.

When receiving the long BSR MAC CE, the base station may allocate, based on the configured "logicalChannelDelay" and "logicalChannelPER", an air interface resource to a LC corresponding to the long BSR MAC CE.

Subsequently, a sequence of sending BSRs of different channels when the BSR is the long BSR MAC CE is described using examples.

For example, in the embodiment shown in FIG. 4A, when there is the to-be-transmitted data packet on the enhanced LC, and there is no or there is the to-be-transmitted data packet on the conventional LC, the UE 100 may send the BSR of the enhanced LC to the base station 200. In other words, when there is the to-be transmitted data packet on both the enhanced LC and the conventional LC, the UE 100 may first send the BSR of the enhanced LC, to preferentially schedule the to-be-transmitted data packet on the enhanced LC. When there is no to-be-transmitted data packet on the enhanced LC and there is the to-be-transmitted data packet on the conventional LC, the UE 100 may send the conventional short BSR MAC CE to the base station 200.

For example, in the embodiment shown in FIG. 4B, when there is the to-be-transmitted data packet on one or more enhanced sub-channels, and there is no or there is the to-be-transmitted data packet on the conventional LC, the UE 100 may send a BSR used to simultaneously report buffer statuses of the one or more enhanced sub-channels to the base station 200. When there is no to-be-transmitted data packet on the enhanced sub-channel and there is the to-be-transmitted data packet on the conventional LC, the UE 100 may send the conventional long BSR MAC CE to the base station 200.

In the foregoing solution, the UE may send, to the base station, a BSR that carries indication information of a transmission quality requirement, so that the base station may allocate an air interface resource to the UE based on the transmission quality requirement, to implement preferential scheduling.

Subsequently, in a specific example, a solution of scheduling different enhanced sub-channels belonging to a same piece of UE is described with reference to FIG. 7.

Figure 7:
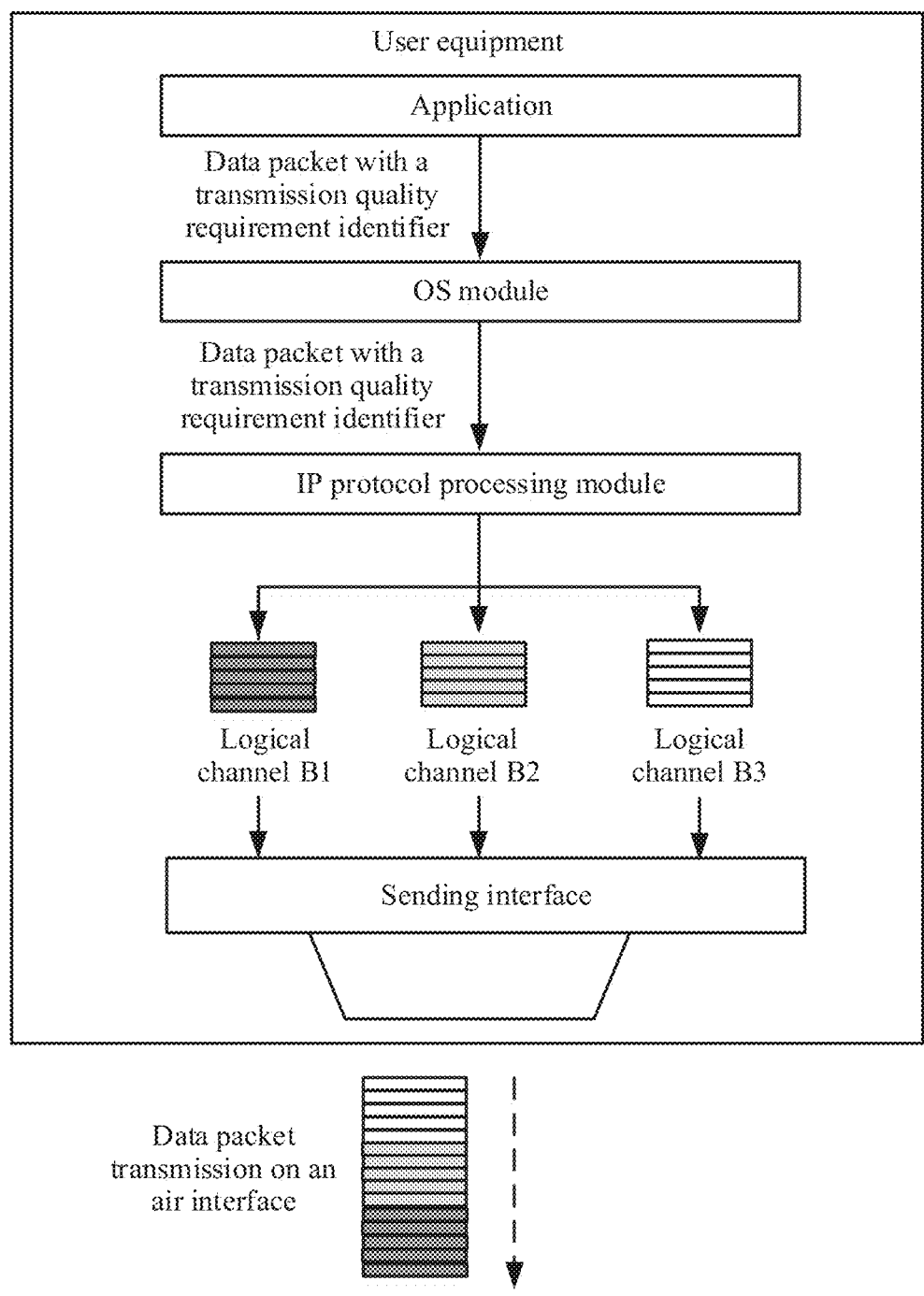
FIG. 7 is a schematic diagram of scheduling of logical channels with different transmission quality requirements according to an embodiment of this disclosure.

As shown in FIG. 7, the UE may include an application, an operating system (OS) module, an IP protocol processing module, a plurality of enhanced sub-channels, and a sending interface. For implementation of the enhanced sub-channel, refer to the foregoing descriptions of the embodiment shown in FIG. 4B.

The application may generate a data packet, and may add a transmission quality requirement identifier to an important data packet. No transmission quality requirement identifier is added to a common data packet. For details, refer to the foregoing descriptions of the embodiment shown in FIG. 4B.

In this example, a case in which the application transfers, to the OS module, a data packet that carries a transmission quality requirement identifier is emphatically described, to describe a solution for scheduling different enhanced sub-channels.

As shown in FIG. 7, the application transfers, to the OS module, the data packet that carries the transmission quality requirement identifier. For example, the OS module may include an IP functional entity, and may package the data packet based on an IP layer protocol. For example, the IP functional entity may package the transmission quality requirement identifier into an IP header of the data packet. For example, the transmission quality requirement identifier may be a bit string with a length of 3 bits. Three bits may be selected from an Options field in the IP header to fill in the transmission quality requirement identifier.

The OS module may transfer a processed data packet to the IP protocol processing module. After being configured, the IP protocol processing module may parse the IP header of the data packet, extract the transmission quality requirement identifier of the IP header, and place the data packet on a corresponding enhanced sub-channel based on a correspondence between a transmission quality requirement identifier and an enhanced sub-channel, to use the data packet as a to-be-transmitted data packet on the enhanced sub-channel. For details, refer to the foregoing descriptions of the embodiment shown in FIG. 4B.

Continue to refer to FIG. 7. An enhanced sub-channel B1, an enhanced sub-channel B2, and an enhanced sub-channel B3 may be set to simultaneously have to-be-transmitted data packets, and a transmission quality requirement of the enhanced sub-channel B3>a transmission quality requirement of the enhanced sub-channel B2>a transmission quality requirement of the enhanced sub-channel B1.

The sending interface may first send a BSR of the enhanced sub-channel B3, then send a BSR of the enhanced sub-channel B2, and finally send a BSR of the enhanced sub-channel B1, so that an air interface resource may be allocated to the enhanced sub-channel B3 before the enhanced sub-channel B2 and the enhanced sub-channel B1, and an air interface resource may be allocated to the enhanced sub-channel B2 before the enhanced sub-channel B1. In this way, the to-be-transmitted data packet on the enhanced sub-channel B3 is sent first, then the to-be-transmitted data packet on the enhanced sub-channel B2 is sent, and the to-be-transmitted data packet on the enhanced sub-channel B3 is sent at last.

Therefore, an air interface resource may be preferentially applied for an important data packet through air interface scheduling in which a data packet is used as a granularity, so that timely sending of the important data packet is ensured.

In the foregoing solution, air interface scheduling in which a data packet is used as a granularity is implemented, and an air interface resource can be applied for the important data packet based on a preset transmission quality requirement, so that uplink transmission quality of the important data packet is ensured. Further, the air interface resource can be preferentially applied for the important data packet, so that timely sending of the important data packet is ensured.

Subsequently, a solution in which the base station allocates the air interface resource based on the transmission quality requirement is described using an example with reference to FIG. 1 and FIG. 8. As shown in FIG. 8, the solution may include the following steps.

Step 801: The base station 200 may receive a BSR C1 sent by the UE 100. The BSR C1 includes indication information of a transmission quality requirement D11 of a LC D1.

The LC D1 is a LC of the UE 100, and may be specifically the enhanced LC in the embodiment shown in FIG. 4A, or the enhanced sub-channel in the embodiment shown in FIG. 4B.

For example, the BSR C1 may be an enhanced short BSR MAC CE or an enhanced long BSR MAC CE. The indication information of the transmission quality requirement D11 may be information filled in a transmission quality requirement indication information field in the enhanced short BSR MAC CE or the enhanced long BSR MAC CE. The base station 200 may determine the transmission quality requirement D11 based on a pre-configured correspondence between indication information of a transmission quality requirement and the transmission quality requirement using the indication information of the transmission quality requirement D11.

For example, the BSR C1 may be a conventional short BSR MAC CE or a conventional long BSR MAC CE. The indication information of the transmission quality requirement D11 may be a LCG ID of the LC D1. The base station 200 may determine the transmission quality requirement D11 based on a pre-configured correspondence between a LCG ID and a transmission quality requirement using the LCG ID of the LC D1.

Step 803: The base station 200 may allocate an air interface resource D12 to the UE 100 based on the transmission quality requirement D11, so that the UE 100 sends a to-be-transmitted data packet on the LC D11 to the base station using the air interface resource D12. In this way, actual transmission quality of the to-be-transmitted data packet on the LC D11 can reach or be close to the transmission quality requirement D11.

When the base station 200 simultaneously schedules a plurality of pieces of UE, and there is a shortage of air interface resources, the base station 200 may allocate a relatively large quantity of air interface resources to UE with a relatively high transmission quality requirement.

In an illustrative example, the base station 200 may further receive a BSR C2 from UE E1, and the BSR C2 includes indication information of a transmission quality requirement D21 of a LC D2. The LC D2 is a LC of the UE E1, and may be specifically the enhanced LC in the embodiment shown in FIG. 4A, or the enhanced sub-channel in the embodiment shown in FIG. 4B. The UE E1 is UE different from the UE 100.

The base station 200 may determine the transmission quality requirement D21 based on the indication information of the transmission quality requirement D21.

When allocating the air interface resource to the UE 100 based on the transmission quality requirement D11, the base station 200 may also allocate an air interface resource D22 to the UE E1 based on the transmission quality requirement D21.

If the transmission quality requirement D21 is lower than the transmission quality requirement D11, when another condition is the same or similar (for example, a buffer size in the BSR C2 is equal to a buffer size in the BSR C1), more air interface resources may be allocated to the UE 100; in other words, there are more air interface resources D12 than the air interface resource D22.

In another illustrative example, the base station 200 may further receive a BSR C3 from UE E2. The BSR C3 may be used to report a buffer status of the conventional LC shown in FIG. 4A or FIG. 4B. In other words, the BSR C3 does not include indication information of a transmission quality requirement. When allocating the air interface resource to the UE 100 based on the transmission quality requirement D11, the base station 200 also allocates an air interface resource D32 to the UE E2. When another condition is the same or similar (for example, a buffer size in the BSR C3 is equal to a buffer size in the BSR C1), more air interface resources may be allocated to the UE 100; in other words, there are more air interface resources D12 than the air interface resource D32. The UE E2 is UE different from UE 100.

In another illustrative example, when the BSR C1 is a long BSR MAC CE, buffer statuses of a plurality of enhanced sub-channels may be reported in the BSR C1. For the enhanced sub-channel, refer to the descriptions of the embodiment shown in FIG. 4B.

The BSR C1 may be set to report a buffer status of an enhanced sub-channel d1 and a buffer status of an enhanced sub-channel d2. Accordingly, the BSR C1 includes indication information of a transmission quality requirement d11 of the enhanced sub-channel d1 and indication information of a transmission quality requirement d21 of the enhanced sub-channel d2.

The base station 200 may allocate air interface resources to the enhanced sub-channel d1 and the enhanced sub-channel d2 based on the transmission quality requirement d11 and the transmission quality requirement d21. If other conditions of the enhanced sub-channel d1 and the enhanced sub-channel d2 are the same or similar (for example, a buffer size of the enhanced sub-channel d1 is equal to a buffer size of the enhanced sub-channel d2), when the transmission quality requirement d11 is higher than the transmission quality requirement d21, more air interface resources may be allocated to the enhanced sub-channel d1; in other words, there are more air interface resources allocated to the enhanced sub-channel d1 than air interface resources allocated to the enhanced sub-channel d2.

In the foregoing solution, air interface scheduling in which a data packet is used as a granularity is implemented, and an air interface resource can be applied for the important data packet based on a preset transmission quality requirement, so that uplink transmission quality of the important data packet is ensured.

Subsequently, in a specific example, a solution in which the base station allocates the air interface resource is described using an example with reference to FIG. 9A, FIG. 9B, FIG. 9C, FIG. 9D, and FIG. 9E.

Figure 9A:
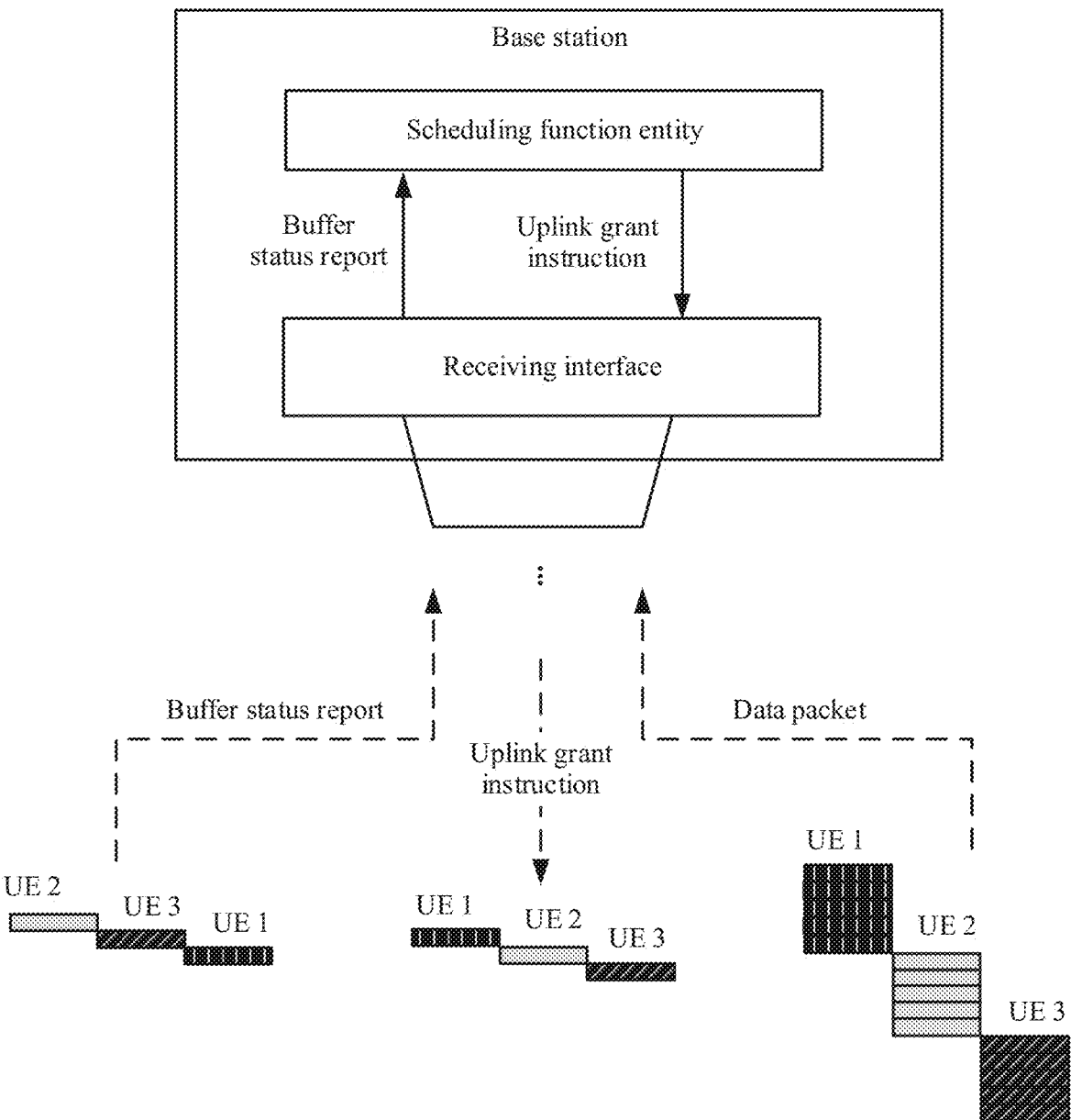
FIG. 9A is a schematic diagram of scheduling performed based on BSRs that carry different transmission quality requirements according to an embodiment of this disclosure.

As shown in FIG. 9A, the base station may be set to sequentially receive, in a time sequence through a receiving interface of the base station, a BSR sent by UE 2, a BSR sent by UE 3, and a BSR sent by UE 1. A scheduling functional entity of the base station may allocate air interface resources to the UE 2, the UE 3, and the UE 1 based on the BSR sent by the UE 2, the BSR sent by the UE 3, and the BSR sent by the UE 1, to perform uplink transmission.

A transmission quality requirement indicated by transmission quality requirement indication information in the BSR sent by the UE 1 may be set to be higher than a transmission quality requirement indicated by transmission quality requirement indication information in the BSR sent by the UE 2, and the transmission quality requirement indicated by the transmission quality requirement indication information in the BSR sent by the UE 2 is higher than a transmission quality requirement indicated by transmission quality requirement indication information in the BSR sent by the UE 3. The scheduling functional entity may separately deliver uplink transmission instructions to the UE 1, the UE 2, and the UE 3, to indicate, to each UE, the air interface resources used for uplink transmission. Based on the air interface resources indicated by the uplink transmission instruction, the UE 1 may first send a data packet to the base station, and then the UE 2 may send a data packet to the base station, and then the UE 3 may send a data packet to the base station.

Subsequently, an air interface resource allocation solution is specifically described.

For example, the scheduling functional entity may separately determine signal quality M11 of the UE 1 on a resource block (RB) 1, signal quality M12 on an RB 2, signal quality M13 on an RB 3, and the like based on a signal to interference plus noise ratio (SINR) that is of an uplink sounding reference signal (SRS) and that is fed back by the UE 1. The base station may separately determine signal quality M21 of the UE 2 on the RB 1, signal quality M22 on the RB 2, signal quality M23 on the RB 3, and the like based on a signal to interference plus noise ratio that is of the uplink sounding reference signal and that is fed back by the UE 2. The base station may separately determine signal quality M31 of the UE 3 on the RB 1, signal quality M32 on the RB 2, signal quality M33 on the RB 3, and the like based on a signal to interference plus noise ratio that is of the uplink sounding reference signal and that is fed back by the UE 3. The signal quality M11, the signal quality M12, the signal quality M13, the signal quality M21, the signal quality M22, the signal quality M23, the signal quality M31, the signal quality M32, and the signal quality M33 may constitute a channel quality matrix M shown in Table 2.

TABLE 2

| Channel quality matrix M | | | |
|---|---|---|---|
| | RB 1 | RB 2 | RB 3 | ... |
| UE 1 | M11 | M12 | M13 | ... |
| UE 2 | M21 | M22 | M23 | ... |
| UE 3 | M31 | M32 | M33 | ... |

Figure 9B:
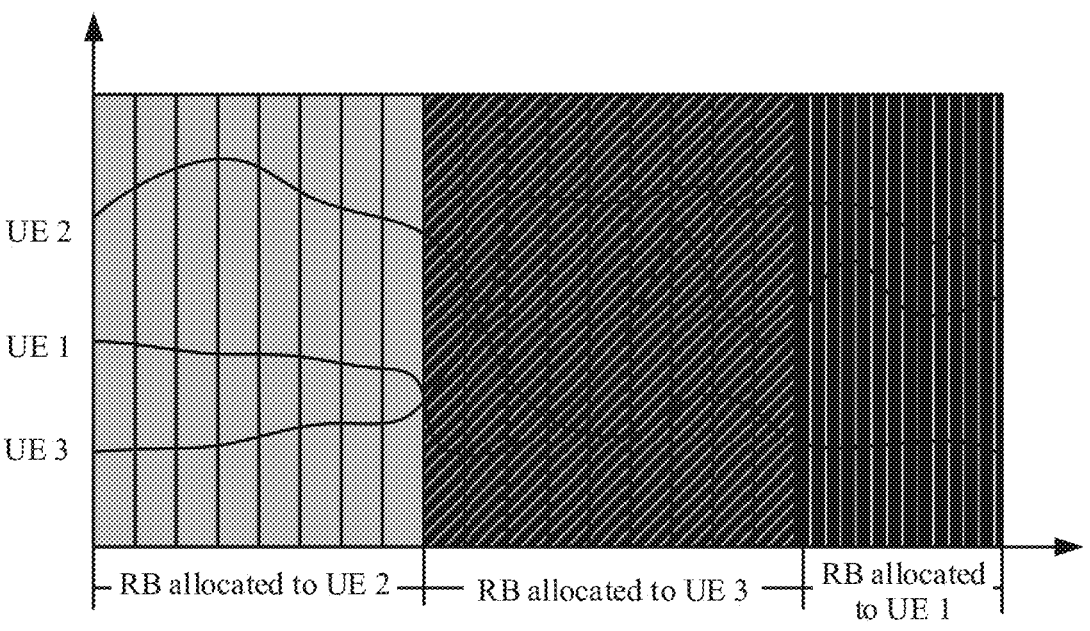
FIG. 9B is a schematic diagram of a resource block allocation result.
Figure 9C:
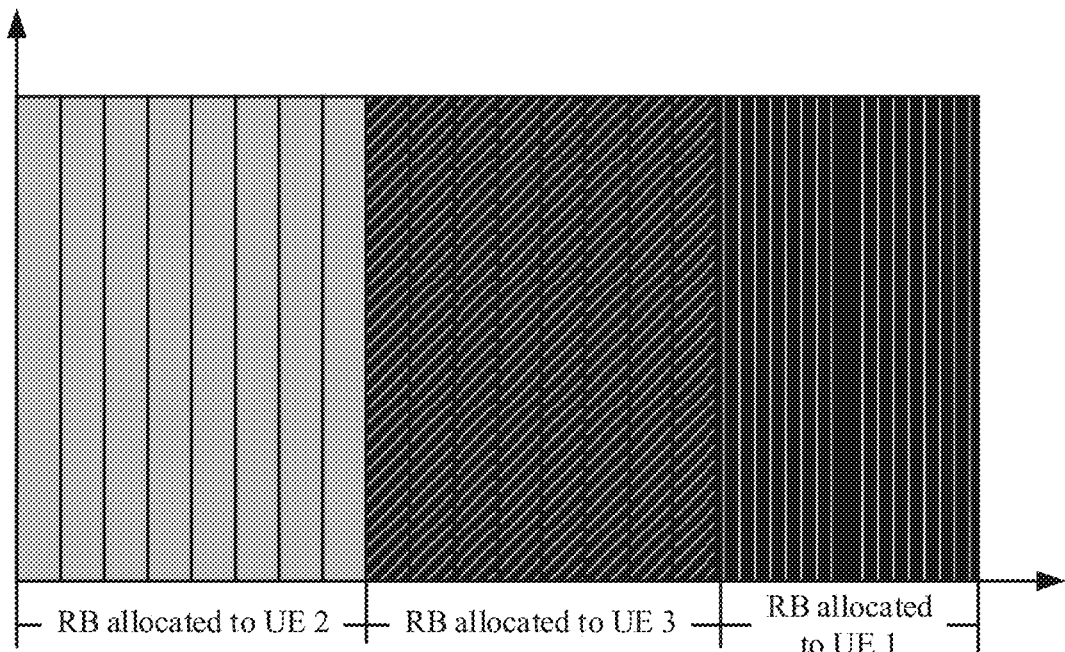
FIG. 9C is a schematic diagram of a resource block allocation result.

The scheduling functional entity may allocate RBs to the UE 1, the UE 2, and the UE 3 based on the channel quality matrix M. An allocation result may be shown in FIG. 9B. A curve shown in FIG. 9B represents signal quality of corresponding UE on each RB.

For example, the functional scheduling entity may obtain an actual service data volume matrix R=(Q, N) of each UE based on a modulation scheme corresponding to a channel quality indicator (CQI) fed back by each UE, a quantity of bits that can be transmitted, and a buffer size in a BSR sent by each UE. Q represents a maximum transmission amount (determined by the modulation scheme and the quantity of bits that can be transmitted) corresponding to the CQI, and N is the buffer size in the BSR. Q corresponding to the UE 3 may be set to be greater than N, and an extra RB of the UE 3 may be allocated to the UE 1. An RB allocation result shown in FIG. 9C can be obtained.

For example, the BSR sent by each UE may include a 5G QoS identifier (5QI). The scheduling functional entity may re-allocate the RB based on the RB allocation result shown in FIG. 9C and the 5QI corresponding to each UE. A 5QI corresponding to the UE 1 is higher than a 5QI corresponding to the UE 3, and some RBs in RBs allocated to the UE 3 may be allocated to the UE 1, to obtain an RB allocation result shown in FIG. 9D.

Figure 9D:
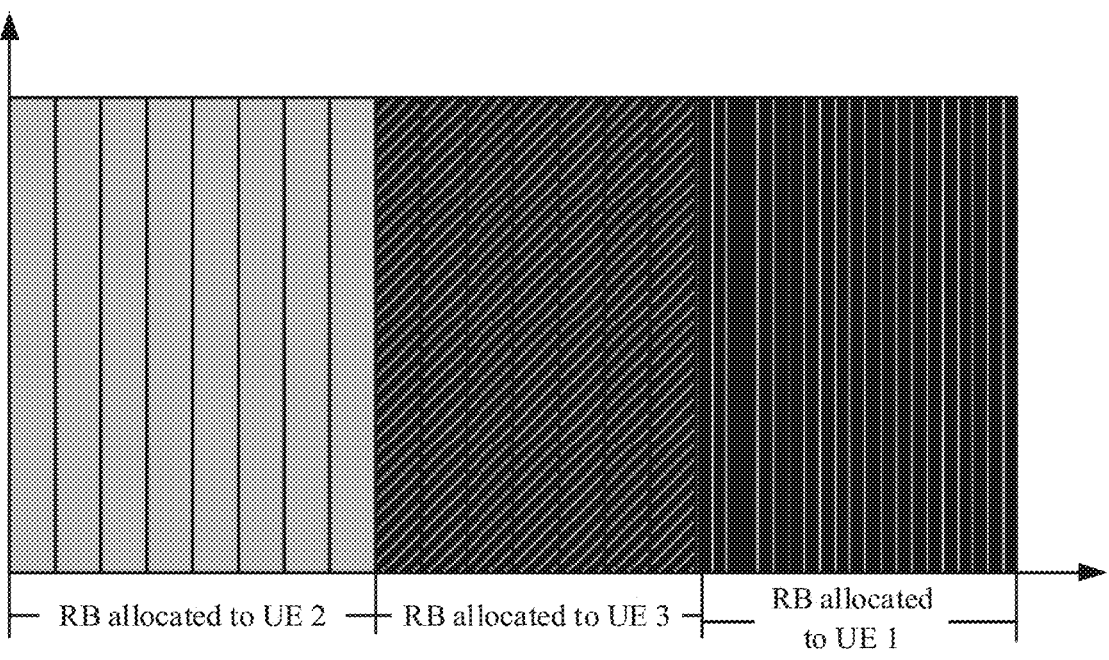
FIG. 9D is a schematic diagram of a resource block allocation result.
Figure 9E:
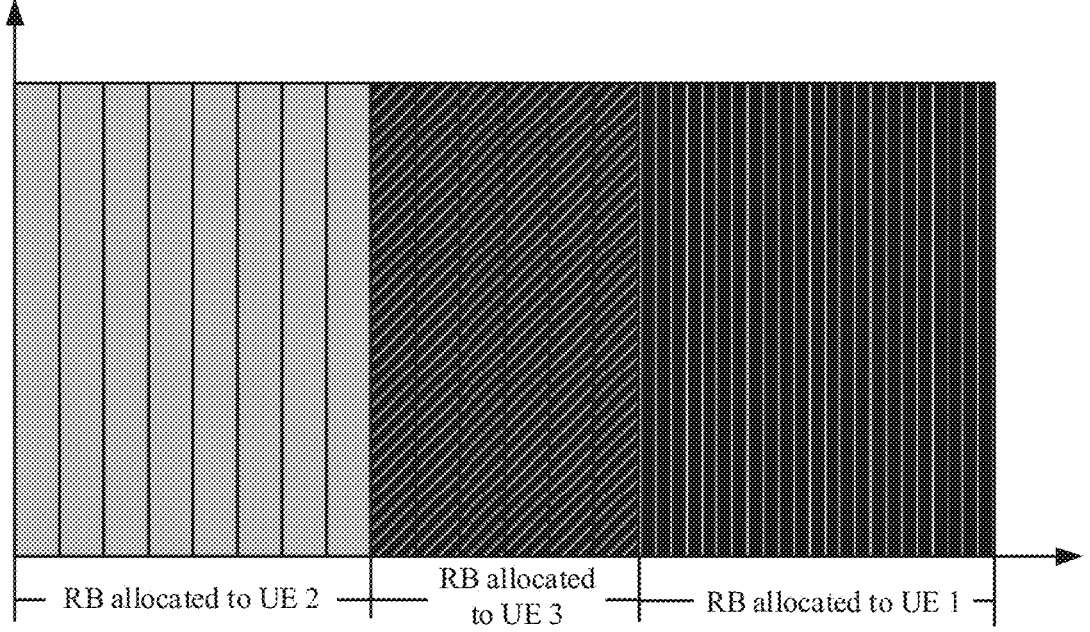
FIG. 9E is a schematic diagram of a resource block allocation result according to an embodiment of this disclosure.

The scheduling functional entity may re-allocate, based on transmission quality indicated by the indication information of the transmission quality requirement in the BSR sent by each UE, the RB in the RB allocation result shown in FIG. 9D. The UE 1 corresponds to a highest transmission quality requirement, and the UE 3 corresponds to a lowest transmission quality requirement. Some RBs in the RBs allocated to the UE 3 may continue to be allocated to the UE 1, to obtain an RB allocation result shown in FIG. 9E.

The scheduling functional entity may deliver an uplink grant instruction to the UE, to indicate, to the UE, an air interface resource allocated to the UE, so that the UE can perform uplink transmission based on the allocated air interface resource.

Therefore, when the transmission quality requirement corresponding to the UE 1 is higher than the transmission quality requirement corresponding to the UE 3, a relatively large quantity of air interface resources may be allocated to the UE 1 when air interface quality of the UE 1 is poorer than air interface quality of the UE 3, so that the air interface resource accurately matches a UE service, and communication experience of the user is improved.

Based on the foregoing descriptions, an embodiment of this disclosure provides a data transmission method, and the method may be performed by UE. The UE is configured with a first LC, and the first LC corresponds to a preset first transmission quality requirement. For details, refer to the foregoing descriptions of the enhanced LC shown in FIG. 4A and the enhanced sub-channel shown in FIG. 4B.

As shown in FIG. 10, the method may include the following steps.

Step 1001: Obtain a first data packet generated by a first application, where the first application runs on the UE.

For details, refer to the foregoing descriptions of the data packet generation module shown in FIG. 4A and FIG. 4B.

Step 1003: When the first data packet carries a first identifier, use the first data packet as a to-be-transmitted data packet on the first LC, where the first identifier is used to indicate that the first data packet needs to be sent on an air interface based on the first transmission quality requirement. The first identifier may also be referred to as an importance identifier.

For details, refer to the foregoing descriptions of the embodiments shown in FIG. 4A and FIG. 4B.

Step 1005: Send a first BSR to a base station, where the first BSR includes indication information of the first transmission quality requirement, so that the base station allocates a first air interface resource to the first LC based on the first transmission quality requirement.

For details, refer to the foregoing descriptions of the embodiments shown in FIG. 5A, FIG. 5B, FIG. 6A, FIG. 6B, and FIG. 6C.

Step 1007: Send the to-be-transmitted data packet on the first LC to the base station using the first air interface resource.

It may be understood that the base station may allocate an air interface resource to a corresponding LC based on a BSR reported by the UE. Then, the UE is notified of the air interface resource using an uplink grant instruction. Therefore, the UE may send the to-be-transmitted data packet on the LC to the base station using the air interface resource.

In some embodiments, the UE is configured with a second LC, and the second LC corresponds to no transmission quality requirement, or a transmission quality requirement corresponding to the second LC is lower than the first transmission quality requirement. The method further includes obtaining a second data packet generated by the first application; and when the second data packet does not carry the first identifier, using the second data packet as a to-be-transmitted data packet on the second LC.

For details, refer to the foregoing descriptions of the embodiments shown in FIG. 4A and FIG. 4B.

In an illustrative example of these embodiments, the method further includes sending, when there is no to-be-transmitted data packet on the first LC and there is the to-be-transmitted data packet on the second LC, a BSR corresponding to the second LC to the base station, so that the base station allocates a second air interface resource to the second LC; and sending the to-be-transmitted data packet on the second LC to the base station using the second air interface resource.

For details, refer to the foregoing descriptions of the embodiments shown in FIG. 5A, FIG. 5B, FIG. 6A, and FIG. 6B.

In an illustrative example of these embodiments, the first data packet and the second data packet belong to a same data flow.

For details, refer to the foregoing descriptions of the embodiments shown in FIG. 4A and FIG. 4B.

In some embodiments, the first LC includes a plurality of channels, the first transmission quality requirement includes a plurality of different transmission quality requirements, channels in the plurality of channels and transmission quality requirements in the different transmission quality requirements are in a one-to-one correspondence, and the first identifier includes a transmission quality requirement identifier. The using the first data packet as a to-be-transmitted data packet on the first LC includes determining, from the plurality of channels, a first channel that matches the transmission quality requirement identifier, and using the first data packet as the to-be-transmitted data packet on the first channel.

For details, refer to the foregoing descriptions of the embodiments shown in FIG. 4B.

In an illustrative example of these embodiments, the first BSR is a short BSR MAC CE. When the first channel is a channel with a highest transmission quality requirement in non-empty channels, the indication information is a message used to indicate a transmission quality requirement of the first channel, so that the base station allocates an air interface resource to the first channel based on the transmission quality requirement of the first channel. The non-empty channel is a channel with a to-be-transmitted data packet in the plurality of channels.

For details, refer to the foregoing descriptions of the embodiments shown in FIG. 5A and FIG. 5B.

In an illustrative example of these embodiments, the first BSR is a long BSR MAC CE, and the indication information includes information used to indicate a transmission quality requirement of the first channel and information used to indicate a transmission quality requirement of a second channel, so that the base station separately allocates air interface resources to the first channel and the second channel based on the transmission quality requirement of the first channel and the transmission quality requirement of the second channel. The first channel and the second channel are channels with the to-be-transmitted data packet in the plurality of channels.

For details, refer to the foregoing descriptions of the embodiments shown in FIG. 6A, FIG. 6B, and FIG. 6C.

In some embodiments, the first BSR includes a LC LCG ID field, a buffer size field, and a transmission quality requirement indication information field. The indication information is a bit indicator in the transmission quality requirement indication information field.

For details, refer to the foregoing descriptions of the embodiments shown in FIG. 5B, FIG. 6B, and FIG. 6C.

In some embodiments, the base station is pre-configured with a correspondence between an identifier of the first LC and the first transmission quality requirement, and the indication information is the identifier of the first LC in the first BSR.

For details, refer to the foregoing descriptions of the embodiments shown in FIG. 5A and FIG. 6A.

In some embodiments, the first transmission quality requirement includes a delay requirement and/or a bit error rate requirement.

In the data transmission method provided in this embodiment of this disclosure, air interface scheduling in which a data packet is used as a granularity can be implemented, and an air interface resource can be applied for an important data packet based on a preset transmission quality requirement, so that uplink transmission quality of the important data packet is ensured.

Figure 11:
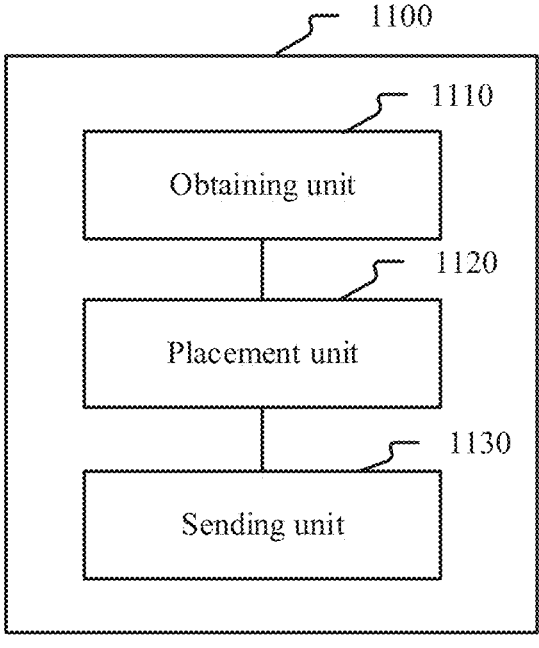
FIG. 11 is a schematic block diagram of a data transmission apparatus according to an embodiment of this disclosure.

As shown in FIG. 11, an embodiment of this disclosure provides a data transmission apparatus 1100, and the data transmission apparatus 1100 is configured on UE. The UE is configured with a first LC, and the first LC corresponds to a preset first transmission quality requirement. The apparatus 1100 may include an obtaining unit 1110, configured to obtain a first data packet generated by a first application, where the first application runs on the UE; a placement unit 1120, configured to use, when the first data packet carries a first identifier, the first data packet as a to-be-transmitted data packet on the first LC, where the first identifier is used to indicate that the first data packet needs to be sent on an air interface based on the first transmission quality requirement; and a sending unit 1130, configured to send a first BSR to a base station, where the first BSR includes indication information of the first transmission quality requirement, so that the base station allocates a first air interface resource to the first LC based on the first transmission quality requirement.

The sending unit 1130 is further configured to send the to-be-transmitted data packet on the first LC to the base station using the first air interface resource.

For functions of the functional units of the apparatus 1100, refer to the foregoing descriptions and implementations of the method embodiments shown in FIG. 10.

In the data transmission apparatus provided in this embodiment of this disclosure, air interface scheduling in which a data packet is used as a granularity can be implemented, and an air interface resource can be applied for an important data packet based on a preset transmission quality requirement, so that uplink transmission quality of the important data packet is ensured.

Figure 12:
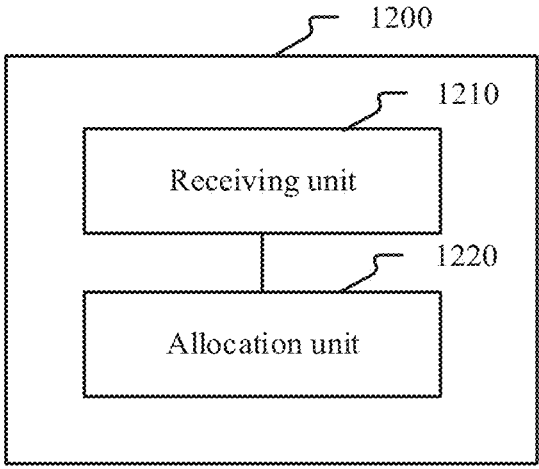
FIG. 12 is a schematic block diagram of a data transmission apparatus according to an embodiment of this disclosure.

As shown in FIG. 12, an embodiment of this disclosure provides a data transmission apparatus 1200 that includes a receiving unit 1210, configured to receive a first BSR from first UE, where the first BSR includes indication information of a first transmission quality requirement, and the first transmission quality requirement is a transmission quality requirement of a first LC; and an allocation unit 1220, configured to allocate a first air interface resource to the first UE based on the first transmission quality requirement, so that the first UE sends a to-be-transmitted data packet on the first LC using the first air interface resource.

For functions of the functional units of the apparatus 1200, refer to the foregoing descriptions and implementations of the method embodiments shown in FIG. 8.

In data transmission apparatus provided in this embodiment of this disclosure, an air interface resource may be allocated to the UE based on transmission quality indicated by indication information in a BSR sent by the UE, so that uplink transmission quality of a data packet sent by the UE is ensured, and communication experience of a user is improved.

The apparatuses provided in embodiments of this disclosure are mainly described above from a perspective of a method procedure. It may be understood that, to implement the foregoing functions, each electronic device includes a corresponding hardware structure and/or a corresponding software module that execute various functions. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 13:
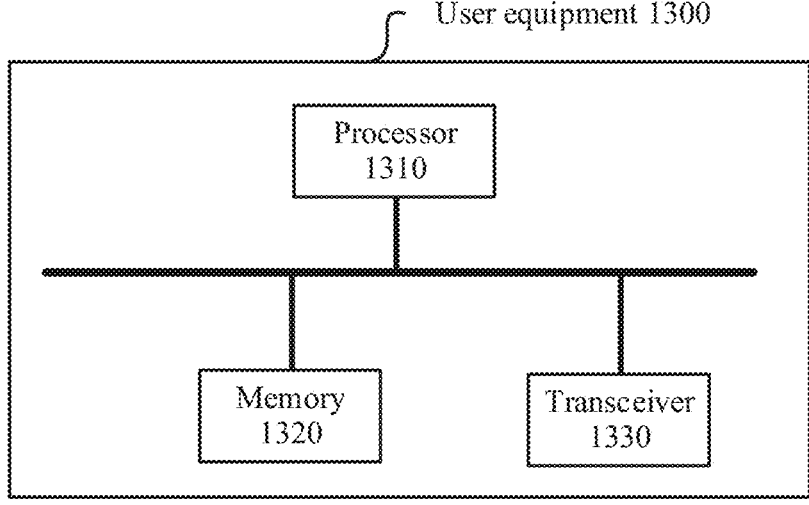
FIG. 13 is a schematic diagram of a structure of UE according to an embodiment of this disclosure.

As shown in FIG. 13, an embodiment of this disclosure provides UE 1300. The UE 1300 may include a processor 1310, a memory 1320, and a transceiver 1330. The memory 1320 stores instructions, and the instructions may be executed by the processor 1310. When the instructions are executed by the processor 1310, the UE 1300 may perform an operation performed by the UE in the foregoing method embodiments, for example, an operation performed by the UE in the embodiments shown in FIG. 10. Specifically, the processor 1310 may perform a data processing operation, and the transceiver 1330 may perform a data sending and/or receiving operation.

Figure 14:
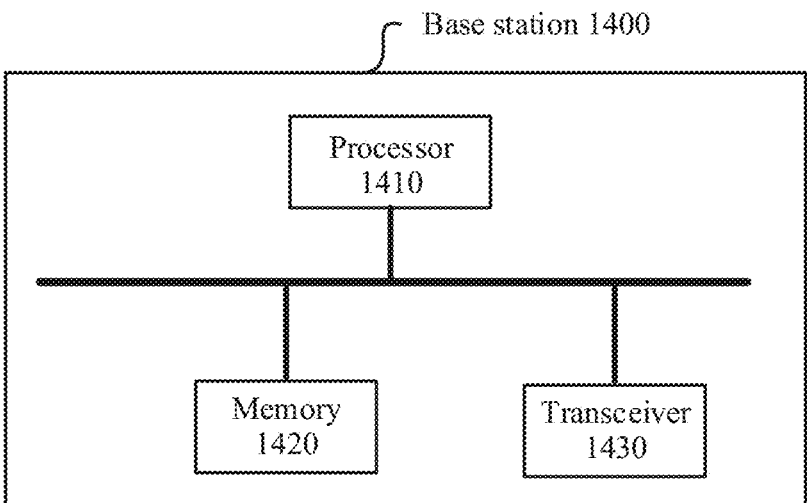
FIG. 14 is a schematic diagram of a structure of a base station according to an embodiment of this disclosure.

As shown in FIG. 14, an embodiment of this disclosure provides a base station 1400. The base station 1400 may include a processor 1410, a memory 1420, and a transceiver 1430. The memory 1420 stores instructions, and the instructions may be executed by the processor 1410. When the instructions are executed by the processor 1410, the base station 1400 may perform an operation performed by the base station in the foregoing method embodiments, for example, an operation performed by the base station in the embodiments shown in FIG. 8. Specifically, the processor 1410 may perform a data processing operation, and the transceiver 1430 may perform a data sending and/or receiving operation.

The method steps in embodiments of this disclosure may be implemented in a hardware manner, or may be implemented in a manner of executing software instructions by the processor. The software instruction may include a corresponding software module. The software module may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact disc ROM (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be disposed in an application-specific integrated circuit (ASIC).

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedures or functions according to embodiments of this disclosure are all or partially generated. The computer may be a general-purpose computer, a dedicated computer, a computer network, or another programmable apparatus. The computer instruction may be stored in a computer-readable storage medium, or may be transmitted using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It may be understood that various numbers in embodiments of this disclosure are merely used for differentiation for ease of description, and are not used to limit the scope of embodiments of this disclosure.

What is claimed is:

1. A method implemented by a user equipment; the method comprising:

obtaining a first data packet from an application running on the user equipment;

determining that the first data packet carries a first identifier indicating that the first data packet needs to be sent on an air interface according to a first transmission quality requirement;

using, in response to determining that the first data packet carries the first identifier, the first data packet as a first to-be-transmitted data packet on a first logical channel of the user equipment, wherein the first logical channel corresponds to the first transmission quality requirement;

sending, to a base station, a first buffer status report (BSR) comprising indication information of the first transmission quality requirement for allocating a first air interface resource to the first logical channel according to the first transmission quality requirement; and sending, to the base station, the first to-be-transmitted data packet on the first logical channel using the first air interface resource;

obtaining a second data packet from the application;

determining that the second data packet does not carry the first identifier:

using the second data packet as a second to-be-transmitted data packet on a second logical channel of the user equipment in response to determining that the second data packet does not carry the first identifier, wherein the second logical channel corresponds to a lower transmission quality requirement than the first transmission quality requirement or corresponds to no transmission quality requirement;

determining that there is no to-be-transmitted data packet on the first logical channel and there is the second to-be-transmitted data packet on the second logical channel;

sending, to the base station in response to determining that there is no to-be-transmitted data packet on the first logical channel and there is the second to-be-transmitted data packet on the second logical channel, a second BSR corresponding to the second logical channel for allocating a second air interface resource to the second logical channel; and sending, to the base station, the second to-be-transmitted data packet on the second logical channel using the second air interface resource.

2. The method of claim 1, wherein the first data packet and the second data packet belong to a same data flow.

3. The method of claim 1, wherein the first logical channel comprises a plurality of channels, wherein the first transmission quality requirement comprises a plurality of different transmission quality requirements having a one-to-one correspondence to the plurality of channels, wherein the first identifier comprises a transmission quality requirement identifier, and wherein using the first data packet as the first to-be-transmitted data packet on the first logical channel comprises:

determining, from the plurality of channels, a first channel that matches the transmission quality requirement identifier; and using the first data packet as the first to-be-transmitted data packet on the first channel.

4. The method of claim 3, wherein the first BSR is a short BSR medium access control (MAC) control element (CE), and wherein the method further comprises:

determining that the first channel is a channel with a highest transmission quality requirement in non-empty channels in the plurality of channels, wherein a non-empty channel is a channel with a to-be-transmitted data packet; and using, in response to determining that the first channel is the channel with the highest transmission quality requirement in non-empty channels in the plurality of channels, the indication information as a message for indicating the first transmission quality requirement of the first channel for allocating the first air interface resource to the first channel according to the first transmission quality requirement.

5. The method of claim 3, wherein the first BSR is a long BSR medium access control (MAC) control element (CE), wherein the indication information comprises first information indicating the first transmission quality requirement of the first channel and second information indicating a second transmission quality requirement of a second channel for separately allocating air interface resources to the first channel and the second channel according to the first transmission quality requirement and the second transmission quality requirement, and wherein the first channel and the second channel are channels in the plurality of channels with a to-be-transmitted data packet.

6. The method of claim 1, wherein the first BSR comprises a logical channel group identity (LCG ID) field, a buffer size field, and a transmission quality requirement indication information field, and wherein the indication information is a bit indicator in the transmission quality requirement indication information field.

7. The method of claim 1, wherein the indication information is an identifier of the first logical channel that corresponds to the first transmission quality requirement.

8. The method of claim 1, wherein the first transmission quality requirement comprises at least one of a delay requirement or a bit error rate requirement.

9. A user equipment comprising:
a memory configured to store instructions; and
a processor coupled to the memory and configured to execute the instructions to cause the user equipment to:
configure a first logical channel corresponding to a first transmission quality requirement;
obtain a first data packet generated by an application running on the user equipment;
determine that the first data packet carries a first identifier indicating that the first data packet needs to be sent on an air interface according to the first transmission quality requirement;
use, in response to determining that the first data packet carries the first identifier, the first data packet as a first to-be-transmitted data packet on the first logical channel;
send, to a base station, a first buffer status report (BSR) comprising indication information of the first transmission quality requirement for allocating a first air interface resource to the first logical channel according to the first transmission quality requirement;
send, to the base station, the first to-be-transmitted data packet on the first logical channel using the first air interface resource;
configure a second logical channel that corresponds to a lower transmission quality requirement than the first transmission quality requirement or to no transmission quality requirement;
obtain a second data packet generated by the application;
determining that the second data packet does not carry the first identifier;
use, in response to determining that the second data packet does not carry the first identifier, the second data packet as a second to-be-transmitted data packet on the second logical channel;
determine that there is no to-be-transmitted data packet on the first logical channel and there is the to-be-transmitted data packet on the second logical channel;
send, to the base station in response to determining that there is no to-be-transmitted data packet on the first logical channel and there is the second to-be-transmitted data packet on the second logical channel, a second BSR corresponding to the second logical channel for allocating a second air interface resource to the second logical channel; and
send, to the base station, the second to-be-transmitted data packet on the second logical channel using the second air interface resource.

10. The user equipment of claim 9, wherein the first data packet and the second data packet belong to a same data flow.

11. The user equipment of claim 9, wherein the first logical channel comprises a plurality of channels, the first transmission quality requirement comprises a plurality of different transmission quality requirements having a one-to-one correspondence to channels in the plurality of channels, and the first identifier comprises a transmission quality requirement identifier, and wherein to use the first data packet as the first to-be-transmitted data packet on the first logical channel, the processor is further configured to execute the instructions to cause the user equipment to:
determine, from the plurality of channels, a first channel that matches the transmission quality requirement identifier; and
use the first data packet as the first to-be-transmitted data packet on the first channel.

12. The user equipment of claim 11, wherein the first BSR is a short BSR medium access control (MAC) control element (CE), and wherein the processor is further configured to execute the instructions to cause the user equipment to:
determine that the first channel is a channel with a highest transmission quality requirement in non-empty channels in the plurality of channels, wherein a non-empty channel is a channel with a to-be-transmitted data packet; and
using, in response to determining that the first channel is the channel with the highest transmission quality requirement in non-empty channels in the plurality of channels, the indication information as a message for indicating the first transmission quality requirement of the first channel for allocating the first air interface resource to the first channel according to the first transmission quality requirement.

13. The user equipment of claim 11, wherein the first BSR is a long BSR medium access control (MAC) control element (CE), wherein the indication information comprises first information indicating the first transmission quality requirement of the first channel and second information indicating a second transmission quality requirement of a second channel for separately allocating air interface resources to the first channel and the second channel according to the first transmission quality requirement and the second transmission quality requirement, and wherein the first channel and the second channel are channels in the plurality of channels with a to-be-transmitted data packet.

14. The user equipment of claim 9, wherein the first BSR comprises a logical channel group identity (LCG ID) field, a buffer size field, and a transmission quality requirement indication information field, and wherein the indication information is a bit indicator in the transmission quality requirement indication information field.

15. A computer program product comprising computer-executable instructions that are stored on a non-transitory computer-readable storage medium and that, when executed by one or more processors of an apparatus, cause the apparatus to:
configure a first logical channel corresponding to a first transmission quality requirement;
obtain a first data packet generated by an application running on the apparatus;
determine that the first data packet carries a first identifier indicating that the first data packet needs to be sent on an air interface according to the first transmission quality requirement;
use, in response to determining that the first data packet carries the first identifier, the first data packet as a first to-be-transmitted data packet on the first logical channel;
send, to a base station, a first buffer status report (BSR) comprising indication information of the first transmission quality requirement for allocating a first air interface resource to the first logical channel according to the first transmission quality requirement;

send, to the base station, the first to-be-transmitted data packet on the first logical channel using the first air interface resource;

configure a second logical channel that corresponds to a lower transmission quality requirement than the first transmission quality requirement or to no transmission quality requirement;

obtain a second data packet generated by the application;

determining that the second data packet does not carry the first identifier;

use, in response to determining that the second data packet does not carry the first identifier, the second data packet as a second to-be-transmitted data packet on the second logical channel;

determine that there is no to-be-transmitted data packet on the first logical channel and there is the to-be-transmitted data packet on the second logical channel;

send, to the base station in response to determining that there is no to-be-transmitted data packet on the first logical channel and there is the second to-be-transmitted data packet on the second logical channel, a second BSR corresponding to the second logical channel for allocating a second air interface resource to the second logical channel; and send, to the base station, the second to-be-transmitted data packet on the second logical channel using the second air interface resource.

16. The computer program product of claim 15, wherein the first data packet and the second data packet belong to a same data flow.

17. The computer program product of claim 15, wherein the first logical channel comprises a plurality of channels, the first transmission quality requirement comprises a plurality of different transmission quality requirements having a one-to-one correspondence to channels in the plurality of channels, and the first identifier comprises a transmission quality requirement identifier, and wherein to use the first data packet as the first to-be-transmitted data packet on the first logical channel, the one or more processors are further configured to execute the instructions to cause the apparatus to:

determine, from the plurality of channels, a first channel that matches the transmission quality requirement identifier; and use the first data packet as the first to-be-transmitted data packet on the first channel.

18. The computer program product of claim 17, wherein the first BSR is a short BSR medium access control (MAC) control element (CE), and wherein the one or more processors are further configured to execute the instructions to cause the apparatus to:

determine that the first channel is a channel with a highest transmission quality requirement in non-empty channels in the plurality of channels, wherein a non-empty channel is a channel with a to-be-transmitted data packet; and using, in response to determining that the first channel is the channel with the highest transmission quality requirement in non-empty channels in the plurality of channels, the indication information as a message for indicating the first transmission quality requirement of the first channel for allocating the first air interface resource to the first channel according to the first transmission quality requirement.

19. The computer program product of claim 17, wherein the first BSR is a long BSR medium access control (MAC) control element (CE), wherein the indication information comprises first information indicating the first transmission quality requirement of the first channel and second information indicating a second transmission quality requirement of a second channel for separately allocating air interface resources to the first channel and the second channel according to the first transmission quality requirement and the second transmission quality requirement, and wherein the first channel and the second channel are channels in the plurality of channels with a to-be-transmitted data packet.

20. The computer program product of claim 15, wherein the first BSR comprises a logical channel group identity (LCG ID) field, a buffer size field, and a transmission quality requirement indication information field, and wherein the indication information is a bit indicator in the transmission quality requirement indication information field.

* * * * *